(12) United States Patent
Itoga et al.

(10) Patent No.: US 8,194,109 B2
(45) Date of Patent: Jun. 5, 2012

(54) OPTICAL DISK IMAGE FORMING METHOD, OPTICAL DISK IMAGE FORMING APPARATUS, AND COMPUTER READABLE RECORDING MEDIUM STORING OPTICAL DISK IMAGE FORMING PROGRAM

(75) Inventors: Hisanori Itoga, Hamamatsu (JP); Tatsuo Fushiki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1585 days.

(21) Appl. No.: 11/606,297

(22) Filed: Nov. 30, 2006

(65) Prior Publication Data

US 2007/0121467 A1      May 31, 2007

(30) Foreign Application Priority Data

Nov. 30, 2005   (JP) .................................. 2005-346220

(51) Int. Cl.
*B41J 2/435* (2006.01)
(52) U.S. Cl. ......................................................... 347/224
(58) Field of Classification Search .................. 347/224, 347/225; 369/30.15, 47.13, 53.25–53.3, 369/47.15, 53.31
See application file for complete search history.

(56) References Cited

U.S. PATENT DOCUMENTS

| | | | |
|---|---|---|---|
| 4,967,286 A * | 10/1990 | Nomula et al. | 386/232 |
| 7,012,867 B2 | 3/2006 | Kurobe et al. | |
| 7,224,646 B2 | 5/2007 | Morishima | |
| 2004/0037176 A1 | 2/2004 | Morishima | |
| 2004/0057356 A1* | 3/2004 | Morishima | 369/47.4 |
| 2004/0071454 A1 | 4/2004 | Nishizawa | |
| 2004/0160510 A1 | 8/2004 | McClellan | |
| 2005/0058044 A1 | 3/2005 | Koegler, III et al. | |
| 2005/0243160 A1 | 11/2005 | Pettigrew | |

FOREIGN PATENT DOCUMENTS

| | | |
|---|---|---|
| EP | 1 367 570 A2 | 12/2003 |
| EP | 1 439 537 A2 | 7/2004 |
| EP | 1 460 366 A2 | 8/2004 |
| EP | 1 592 014 A2 | 11/2005 |
| JP | 2002-203321 A | 7/2002 |
| JP | 2002-279635 A | 9/2002 |
| JP | 2003-132545 A | 5/2003 |
| JP | 2004-5847 A | 1/2004 |
| JP | 2004-5848 A | 1/2004 |
| JP | 2004-39013 A | 2/2004 |
| JP | 2004-355764 A | 12/2004 |

OTHER PUBLICATIONS

European Search Report dated Mar. 15, 2007 (Ten (10) pages).

(Continued)

*Primary Examiner* — Hai C Pham
(74) *Attorney, Agent, or Firm* — Crowell & Moring LLP

(57) ABSTRACT

Before a host computer transmits image forming data to a CD-R drive, the CD-R drive transmits information of an image forming condition preset in the CD-R drive to the computer. The host computer generates, based on stored original image data, image forming data adapted to the image forming condition on the basis of the information of the image forming condition and transmits the generated image forming data to the CD-R drive. The CD-R drive forms a visual image according to the preset image forming condition on the basis of the transmitted image forming data.

7 Claims, 14 Drawing Sheets

OTHER PUBLICATIONS

CES 2005, HP Press Kit: CES 2005 , PC leadership (Two (2) pages), http//www.hp.com/hpinfo/newsroom/press_kits/2005/ces/pcleadership.html, Nov. 26, 2004.

Fact Sheet, LightScribe Direct Disc Labeling, hp invent, 2004 Hewlett-Packard Development Company, L.P., (Jan. 2005) and for Immediate Release, Media Advisory, Lightscribe Direct Disc Labeling Technology Ready for Market at CES 2005, Las Vegas, Jan. 5, 2005. (Three (3) pages).

Japanese Office Action dated Sep. 30, 2008 with English translation (Five (5) pages).

* cited by examiner

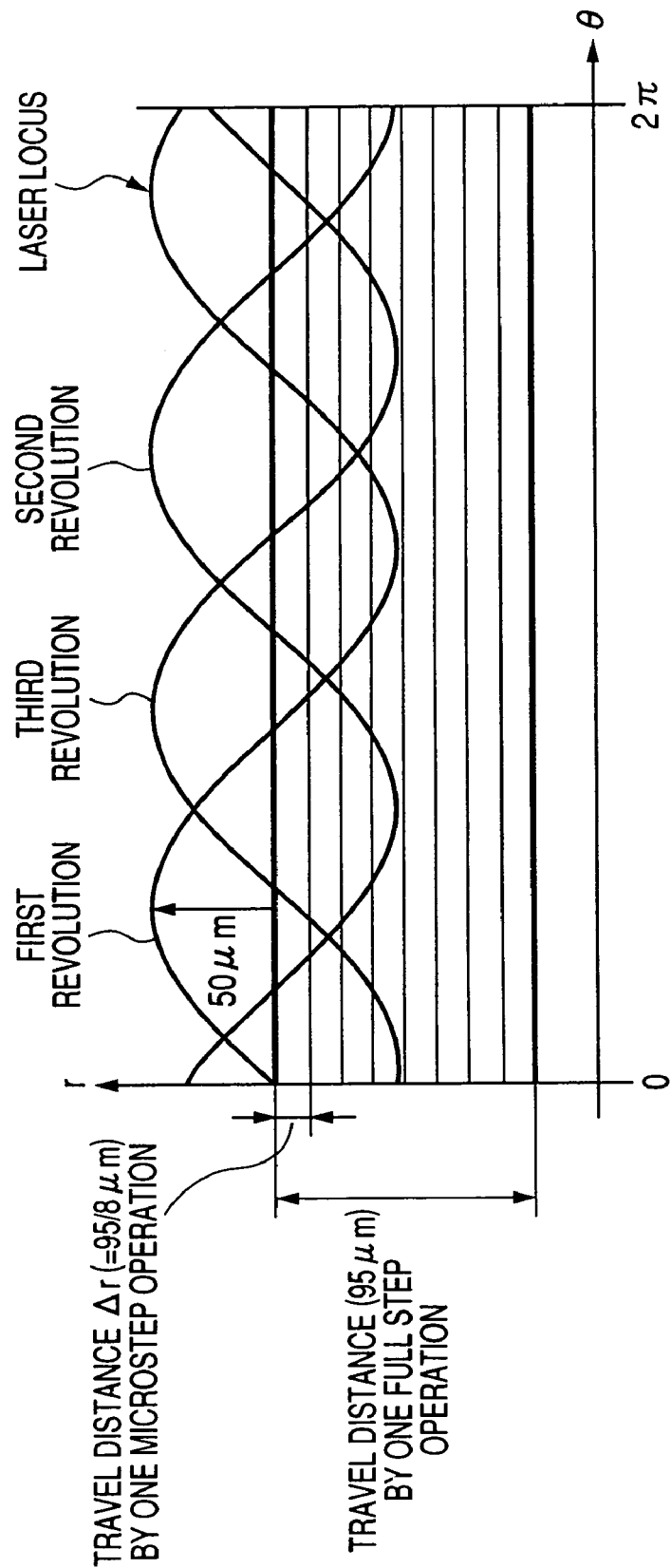

OPTICAL DISK IMAGE FORMING METHOD, OPTICAL DISK IMAGE FORMING APPARATUS, AND COMPUTER READABLE RECORDING MEDIUM STORING OPTICAL DISK IMAGE FORMING PROGRAM

BACKGROUND OF THE INVENTION

The present invention relates to an optical disk image forming method of connecting a computer and an optical disk image forming apparatus in a communication state and transmitting image data from the computer to the optical disk image forming apparatus so as to form a visual image in a label surface or a data recording surface of an optical disk, to an optical disk image forming apparatus thereof, and to an computer readable recording medium storing an optical disk image forming program therefor. Particularly, the present invention relates to a technology that can increase a degree of freedom for design of an optical disk image forming apparatus and can allow an operator to freely set an image forming condition according to a degree of freedom for setting of the image forming condition allowable for each optical disk image forming apparatus.

In Patent Documents 1 and 2, there is disclosed a image forming technology in which an image forming layer is provided by a thermosensitive layer or a photosensitive layer at a label surface of an optical disk, such as a recordable CD or a recordable DVD, and a visual image is formed in the image forming layer by irradiating laser light modulated according to image data from an optical pick-up onto the image forming layer by using an optical disk recording apparatus which can records data on a data recording layer of the optical disk so that. Further, in Patent Document 3, there is disclosed a technology in which laser light modulated according to image data is irradiated onto the data recording layer of the optical disk so as to form pits, and forms a visual image in the data recording layer, instead of recording data thereon.

Patent Document 1: JP-A-2002-203321
Patent Document 2: JP-A-2004-5848
Patent Document 3: JP-A-2004-355764

Further, according to another conventional technology for forming an image on an optical disk surface, image data is generated on a specific image forming condition (a unit transfer amount of an optical pick-up in a disk radial direction, a disk rotation speed, an encoding speed for encoding image data so as to generate a modulated signal of laser light, or the like). Accordingly, a degree of freedom for design of an optical disk image forming apparatus is little. Further, the image forming condition has an effect on an image forming speed and image forming quality (resolution and contrast ratio of a formed image). Since a known image forming program that is executed by a host computer is designed based on a specific image forming condition, a user cannot freely set an image forming condition according to an optical disk image forming apparatus.

SUMMARY OF THE INVENTION

The invention has been made in order to solve the problem inherent in the known technology, and it is an object of the invention to provide an optical disk image forming method that can increase a degree of freedom for design of a disk image forming apparatus and allow a user to freely set an image forming condition according to a degree of freedom for setting of an image forming condition allowable for each optical disk image forming apparatus, an optical disk image forming apparatus thereof, and a computer readable recording medium storing an optical disk image forming program therefor.

In order to solve the above problem, the present invention is characterized by having the following arrangement.

(1) A method of forming an image on an optical disk comprising:
connecting a computer and an optical disk image forming apparatus in a communication state;
storing, in the computer, original image data of an image to be formed as a visual image on a data recording layer of the optical disk or an image forming layer provided separately from the data recording layer;
loading the optical disk on the optical disk image forming apparatus;
transmitting information of a preset image forming condition from the optical disk image forming apparatus to the computer;
generating, by the computer, image forming data adapted to the image forming condition based on the stored original image data and the information of the image forming condition and to transmit the generated image forming data to the optical disk image forming apparatus;
causing the optical disk image forming apparatus to sequentially transfer an optical head in a radial direction of the optical disk while rotating the optical disk; and
irradiating image forming laser light modulated based on the transmitted image forming data from the optical head onto the optical disk according to the preset image forming condition to form the visual image on the data recording layer or the image forming layer.

(2) The method according to (1), wherein
the image forming condition is a condition for a unit transfer amount of the optical head in the radial direction of the optical disk or a condition for a plurality of parameters that are used to calculate the unit transfer amount,
the computer generates, based on the original image data, the image forming data for each position in the radial direction of the optical disk, which is adapted to the unit transfer amount set by the image forming condition, and transmits the generated image forming data to the optical disk image forming apparatus, and
the optical disk image forming apparatus modulates image forming laser light based on the transmitted image forming data while sequentially transferring the optical head by the set unit transfer amount in the radial direction of the optical disk to form the visual image.

(3) The method according to (2), wherein
the transfer of the optical head in the radial direction of the optical disk is executed with a stepping motor as a driving source,
the plurality of parameters used to calculate the unit transfer amount of the optical head include a transfer amount of the optical head by one full step operation of the stepping motor and a division number of a microstep operation of the stepping motor, and
the computer calculates the unit transfer amount of the optical head by an arithmetic operation of 'the transfer amount of the optical head by one full step operation/the division number of the microstep operation'.

(4) The method according to (1), wherein
the image forming condition is a condition for a rotation speed of the optical disk,
the computer generates, based on the original image data, the image forming data for each position in a circumferential direction of the optical disk adapted to the condition of the rotation speed of the optical disk set by the image forming condition and transmits the generated image forming data to the optical disk image forming apparatus, and the optical disk image forming apparatus modulates image forming laser light according to the transmitted image forming data while rotating the optical disk at the set rotation speed to form the visual image.

(5) The method according to (1), wherein the image forming condition is a condition for an encoding speed at which the image forming data is encoded to generate a modulated signal of image forming laser light, the computer generates, based on the original image data, image forming data for each position in a circumferential direction of the optical disk adapted to the condition of the encoding speed set by the image forming condition, and the optical disk image forming apparatus encodes the transmitted image forming data at the set encoding speed to generate the modulated signal of image forming laser light and modulates image forming laser light by the modulated signal to form the visual image, (6) The method according to (1), wherein a position of the original image data is represented by an orthogonal coordinate and a position of the image forming data is represented by a polar coordinate, and a polar coordinate position of the image forming data adapted to the image forming condition is calculated, the polar cording position is converted into an orthogonal coordinate position to obtain a corresponding position of the original image data and the original image data at the obtained corresponding position is used as the image forming data at the corresponding position.

(7) A method of forming an image on an optical disk comprising:

connecting a computer and an optical disk image forming apparatus in a communication state;

storing, in the computer, original image data of an image to be formed as a visual image in a data recording layer of the optical disk or an image forming layer provided separately from the data recording layer;

loading the optical disk on the optical disk image forming apparatus;

transmitting information of an image forming condition settable by an operator for the optical disk image forming apparatus from the optical disk image forming apparatus to the computer;

display the image forming condition on a display of the computer so that an operator can set the image forming condition on the transmitted information of the image forming condition;

transmitting information of contents of the image forming condition set by the operator from the computer to the optical disk image forming apparatus;

generating image forming data adapted to the set image forming condition based on the stored original image data and transmitting the generated image forming data from the computer to the optical disk image forming apparatus;

causing the optical disk image forming apparatus to sequentially transfer an optical head in a radial direction of the optical disk while rotating the optical disk; and irradiating image forming laser light modulated based on the transmitted image forming data from the optical bead onto the optical disk according to the transmitted set image forming condition to form the visual image on the data recording layer or the image forming layer.

(8) The method according to (7), wherein the image forming condition is a condition for a unit transfer amount of the optical head in the radial direction of the optical disk or a condition for a plurality of parameters that are used to calculate the unit transfer amount, the computer generates, based on the original image data, the image forming data for each position in the radial direction of the optical disk, which is adapted to the unit transfer amount set by the image forming condition, and transmits the generated image forming data to the optical disk image forming apparatus, and the optical disk image forming apparatus modulates image forming laser light based on the transmitted image forming data while sequentially transferring the optical head by the set unit transfer amount in the radial direction of the optical disk to form the visual image.

(9) The method according to (8), wherein the transfer of the optical head in the radial direction of the optical disk is executed with a stepping motor as a driving source, the plurality of parameters used to calculate the unit transfer amount of the optical head include a transfer amount of the optical head by one full step operation of the stepping motor and a division number of a microstep operation of the stepping motor, and the computer calculates the unit transfer amount of the optical head by an arithmetic operation of 'the transfer amount of the optical head by one full step operation/the division number of the microstep operation'.

(10) The method according to (7), wherein the image forming condition is a condition for a rotation speed of the optical disk, the computer generates, based on the original image data, the image forming data for each position in a circumferential direction of the optical disk adapted to the condition of the rotation speed of the optical disk set by the image forming condition and transmits the generated image forming data to the optical disk image forming apparatus, and the optical disk image forming apparatus modulates image forming laser light according to the transmitted image forming data while rotating the optical disk at the set rotation speed to form the visual image.

(11) The method according to (7), wherein the image forming condition is a condition for an encoding speed at which the image forming data is encoded to generate a modulated signal of image forming laser light, the computer generates, based on the original image data, image forming data for each position in a circumferential direction of the optical disk adapted to the condition of the encoding speed set by the image forming condition, and the optical disk image forming apparatus encodes the transmitted image forming data at the set encoding speed to generate the modulated signal of image forming laser light and modulates image forming laser light by the modulated signal to form the visual image.

(12) The method according to (7), wherein a position of the original image data is represented by an orthogonal coordinate and a position of the image forming data is represented by a polar coordinate, and a polar coordinate position of the image forming data adapted to the image forming condition is calculated, the polar cording position is converted into an orthogonal coordinate position to obtain a corresponding position of the original image data and the original image data at the obtained corresponding position is used as the image forming data at the corresponding position.

(13) An optical disk image forming apparatus for forming an image on an optical disk, the optical disk image forming apparatus comprising:

an interface that communicates with a computer and receives image forming data from the computer;

an optical head transferred sequentially in a radial direction of the optical disk while the optical disk being rotated;

an image forming unit that modulates and emits image forming laser light from the optical head according to the received image forming data, and irradiates modulated image forming laser light through the optical head onto a data recording layer of the optical disk or an image forming layer provided separately from the data recording layer to form a visual image in the data recording layer or the image forming layer, wherein the interface transmits information of a preset image forming condition to the computer prior to receiving the image forming data from the computer, receives the image forming data generated according to the image forming condition from the computer, and wherein the image forming unit forms the visual image based on the preset image forming condition and the received image forming data.

(14) An optical disk image forming apparatus for forming an image on an optical disk, the optical disk image forming apparatus comprising:

an interface that communicates with a computer and receives image forming data from the computer;

an optical head transferred sequentially in a radial direction of the optical disk while the optical disk being rotated;

an image forming unit that modulates and emits image forming laser light from the optical head according to the received image forming data, and irradiates modulated image forming laser light through the optical head onto a data recording layer of the optical disk or an image forming layer provided separately from the data recording layer to form a visual image in the data recording layer or the image forming layer, wherein the interface transmits information of image forming condition settable by an operator for the optical disk image forming apparatus prior to receiving the image forming data from the computer, receives, from the computer, information of image forming condition set by an operator for the image forming condition and image forming data generated according to the set image forming condition, and wherein the image forming unit forms the visual image on the image forming condition based on the received information of the image forming condition and the received image forming data.

(15) A computer readable recording medium storing an optical disk image forming program to be executed by a computer in which the computer is connectable in a communication state with an optical disk image forming apparatus on which an optical disk is loaded, and stores original image data of an image to be formed as a visible image in a recording layer of an optical disk or an image forming layer provided separately from the data recording layer, and in which the optical disk image forming apparatus includes an interface that receives image forming data from the computer, an optical head transferred sequentially in a radial direction of the optical disk while the optical disk being rotated, an image forming unit that modulates and emits image forming laser light from the optical head according to the received image forming data, and irradiates modulated image forming laser light through the optical head onto a data recording layer of the optical disk or an image forming layer provided separately from the data recording layer to form a visual image in the data recording layer or the image forming layer, the program causes the computer to execute:

receiving information of a preset image forming condition from the optical disk image forming apparatus prior to transmitting the image forming data to the optical disk image forming apparatus;

generating image forming data adapted to the image forming condition based on the stored original image data and the received information of the image forming condition; and transmitting the generated image forming data to the optical disk image forming apparatus.

(16) The program according to (15), wherein the program causes the computer to further execute:

displaying the image forming condition for the number of overwrite times of the image forming data at the same position of the optical disk in the radial direction multiple times on the display so that the operator can set the number of overwrite times prior to transmitting the image forming data to the optical disk image forming apparatus; and transmitting information of the number of overwrite times set by the operator on the display.

(17) A computer readable recording medium storing an optical disk image forming program to be executed by a computer in which the computer is connectable in a communication state with an optical disk image forming apparatus on which an optical disk is loaded, and stores original image data of an image to be formed as a visible image in a recording layer of an optical disk or an image forming layer provided separately from the data recording layer, and in which the optical disk image forming apparatus includes an interface that receives image forming data from the computer, an optical head transferred sequentially in a radial direction of the optical disk while the optical disk being rotated, an image forming unit that modulates and emits image forming laser light from the optical head according to the received image forming data, and irradiates modulated image forming laser light through the optical head onto a data recording layer of the optical disk or an image forming layer provided separately from the data recording layer to form a visual image in the data recording layer or the image forming layer, the program causes the computer to execute:

receiving information of an image forming condition settable by an operator for the optical disk image forming apparatus from the optical disk image forming apparatus prior to transmitting the image forming data to the optical disk image forming apparatus;

displaying the image forming condition on a display so that an operator can set the image forming condition on the basis of the received information of the image forming condition;

transmitting information of contents of the image forming condition set by the operator on the display to the optical disk image forming apparatus; and generating the image forming data adapted to the set image forming condition based on the stored original image data, and transmitting the generated image forming data to the optical disk image forming apparatus.

(18) The program according to (17), wherein the program causes the computer to further execute:

displaying the image forming condition for the number of overwrite times of the image forming data at the same position of the optical disk in the radial direction multiple times on the display so that the operator can set the number of overwrite times prior to transmitting the image forming data to the optical disk image forming apparatus; and transmitting information of the number of overwrite times set by the operator on the display.

According to the invention, before the image forming data is transmitted from the computer to the optical disk image forming apparatus, the optical disk image forming apparatus transmits the information of the image forming condition preset therein to the computer. The computer generates, from the stored original image data, the image forming data adapted to the image forming condition on the basis of the information of the image forming condition and transmits the generated image forming data to the optical disk image forming apparatus. Then, the optical disk image forming apparatus forms the visual image on the preset image forming condition on the basis of the transmitted image forming data. Accordingly, the optical disk image forming apparatus can independently set the image forming condition and receive the image forming data according to the image forming condition from the computer, thereby forming the image. Therefore, it is possible to increase a degree of freedom for design of the optical disk image forming apparatus. In addition, with this configuration, the user can select and use an arbitrary one among various optical disk image forming apparatuses having different image forming conditions according to a difference in manufacturer or the like.

According to the invention, before the image forming data is transmitted from the computer to the optical disk image forming apparatus, the optical disk image forming apparatus transmits the information of the image forming condition settable by the operator for the optical disk image forming apparatus. The computer displays the image forming condition on the display so as to be set by the operator on the basis of the information of the image forming condition. Further, the computer transmits the information of the set content of the image forming condition set by the operator on the basis of display on the display to the optical disk image forming apparatus, and simultaneously generates, from the stored original image data, the image forming data adapted to the set image forming condition and transmits the generated image forming data to the optical disk image forming apparatus. Then, the optical disk image forming apparatus forms the visual image on the image forming condition set by the operator on the basis of the transmitted image forming data. Accordingly, the user can freely set the image forming condition according to a degree of freedom for setting of the image forming condition allowable for each optical disk image forming apparatus.

According to the invention, when a position of the original image data is represented by an orthogonal coordinate and a position of the image forming data is represented by a polar coordinate, a polar coordinate position of the image forming data adapted to the image forming condition is calculated, the polar cording position is converted into an orthogonal coordinate position to obtain a corresponding position of the original image data and the original image data at the obtained corresponding position is used as the image forming data at the corresponding position. Then, for example, the computer sequentially extracts image forming data from the original image data in an order of image forming from a predetermined radial position for starting to write of the optical disk in the above-described method and sequentially transmits the image forming data to the optical disk image forming apparatus in the extraction order (or in an order replaced for the order according to a predetermined replacement rule). The optical disk image forming apparatus receives the image forming data and then operates by a disk rotation speed, an encoding speed, and a unit transfer amount of the optical head in the radial direction of the optical disk to sequentially form image from the radial position for starting to write of the optical disk in a reception order (or in an order replaced for the order to have an original arrangement according to a rule opposite to the replacement rule) according to the received image forming data.

BRIEF DESCRIPTION OF THE DRAWINGS

FIG. 16 is a flowchart showing an example of a locus of a scanning position of laser light 35 at the time of image forming by the CD-R drive of FIG. 1.

DETAILED DESCRIPTION OF PREFERRED EMBODIMENTS

Figure 1:
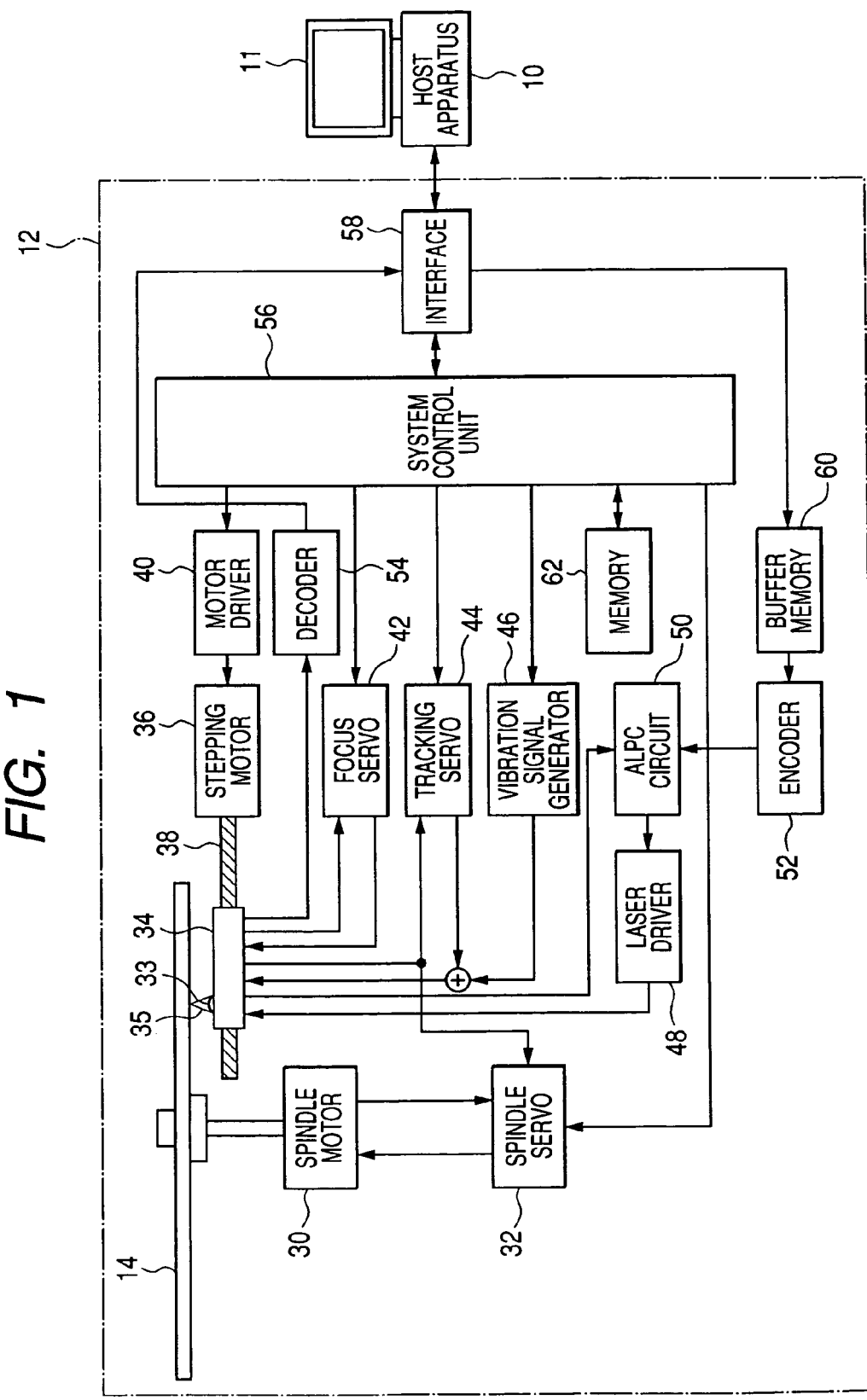
FIG. 1 is a block diagram showing the overall system configuration for implementing an optical disk image forming method according to an embodiment of the invention.

An embodiment of the invention will be described. Here, a case where the invention is applied to a recordable CD system will be described. FIG. 1 shows the overall configuration of a system for implementing an optical disk image forming method according to an embodiment of the invention. The system includes a host computer 10 and a CD-R drive 12 (optical disk recording apparatus) serving as an optical disk image forming apparatus that are connected to each other in a communication state. A display 11 is connected to the host computer 10. The CD-R drive 12 may be incorporated into the host computer 10 or may be provided externally. A CD-R disk 14 in which image forming can be formed on a label surface is loaded on the CD-R drive 12. A data recording/reproducing program (application software) that performs data recording in a data recording layer of the CD-R disk 14 and reproduction of the recorded data, and an image forming program (application software) that performs image forming in an image forming layer of the CD-R disk 14 are installed in the host computer 10. In addition, at the time of image forming, original image data of an image to be formed is stored in a storage device of the host computer 10 in advance. The original image data is in a monochrome multiple gradation (in this embodiment, a gradation having 25 levels from the 0th gradation to the 24th gradation as described below) bitmap format, and thus it has data (gradation data) representing gradations of individual pixels constituting one image to be formed on the CD-R disk 14.

Figure 2:
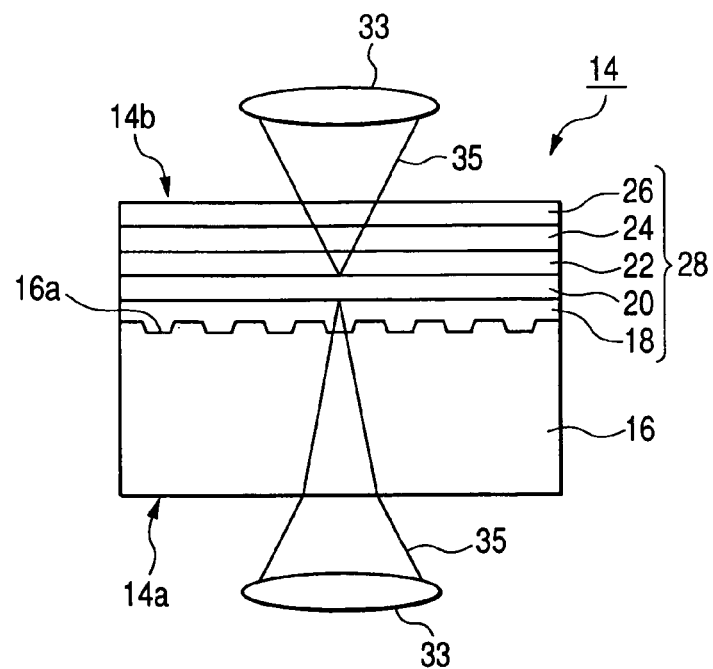
FIG. 2 is a diagram schematically showing the cross-sectional structure of a CD-R disk 14 shown in FIG. 1, in which image can be formed on label surface, taken along a surface passing through a central axis thereof.

FIG. 2 is a schematic view showing a cross-section of the CD-R disk 14, in which image can be formed on label surface, taken along a surface passing through its central axis. The CD-R disk 14 has a transparent substrate 16, and then a dye layer as a data recording layer 18, a reflecting layer 20, a protective layer 22, a thermosensitive layer as an image forming layer 24, and a protective layer 26 are sequentially laminated on a surface of the transparent substrate 16 on which pregrooves 16*a* are formed. At the time of data recording and reproduction, laser light 35 is irradiated from a surface (data recording surface) 14*a* on a side that the transparent substrate 16 is exposed. At this time, laser light 35 is reflected by the reflecting layer 20 to be then focused. At the time of image forming, laser light 35 is irradiated from a surface (label surface) 14*b* on a side that a laminated film 28 is formed. At this time, laser light 35 is reflected by the reflecting layer 20 to be then focused.

In FIG. 1, the CD-R disk 14 rotates by a spindle motor 30. A spindle servo 32 controls the rotation of the spindle motor 30 at a constant linear velocity (CLV) or a constant angular velocity (CAV) at the time of recording and reproduction, and a constant angular velocity (CAV) at the time of image forming. An optical pick-up 34 (optical head) is transferred by a transfer mechanism 38, such as a transfer screw, driven by a stepping motor 36 in a radial direction of the CD-R disk 14 (sled operation). The stepping motor 36 is driven by a motor driver 40 on the basis of an instruction from a system control unit 56.

Figure 3:
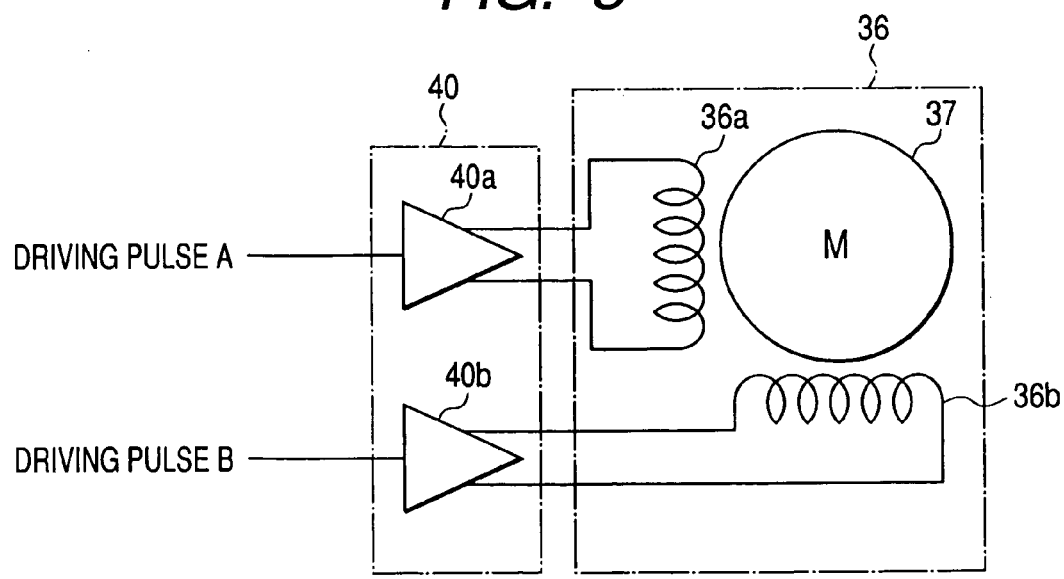
FIG. 3 is a schematic diagram showing an example of the configuration of a stepping motor 36 of FIG. 1.
Figure 4:
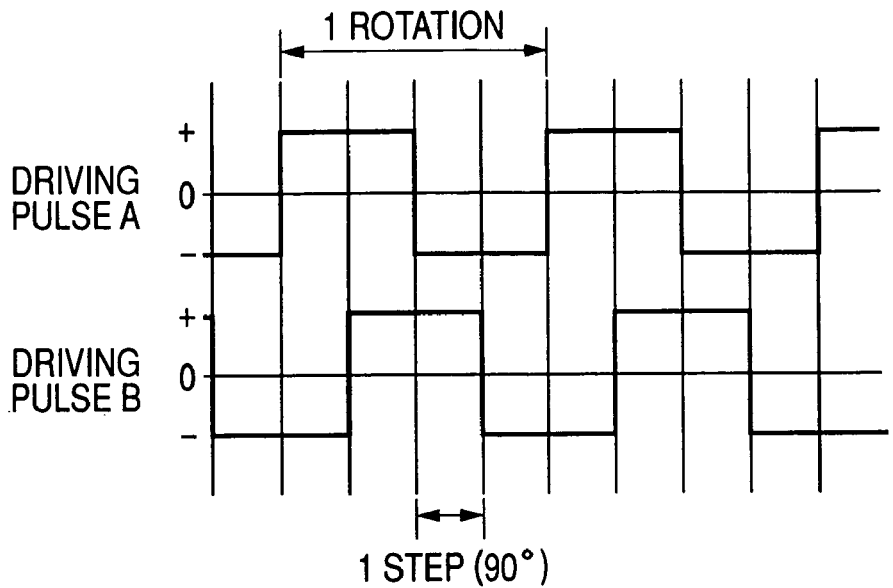
FIG. 4 is a voltage waveform chart of driving pulses A and B when a two-phase stepping motor 36 of FIG. 3 is driven in a full step mode.

The stepping motor 36 is, for example, a two-phase stepping motor shown in FIG. 3. The two-phase stepping motor 36 has two coils 36*a* and 36*b*, and is driven by two driving pulses applied from drivers 40*a* and 40*b* forming the motor driver 40 to the coils 36*a* and 36*b*, respectively, in a bipolar manner. FIG. 4 shows the waveforms of driving pulses A and B applied to the individual coils 36*a* and 36*b* when the two-phase stepping motor 36 is driven in a full step mode. The driving pulses A and B are square waves that has a duty of 50% and whose phases are shifted by 90° such that the polarities thereof are alternately switched. With the driving pulses A and B, a rotor 37 rotates by 90° per one step.

Figure 5:
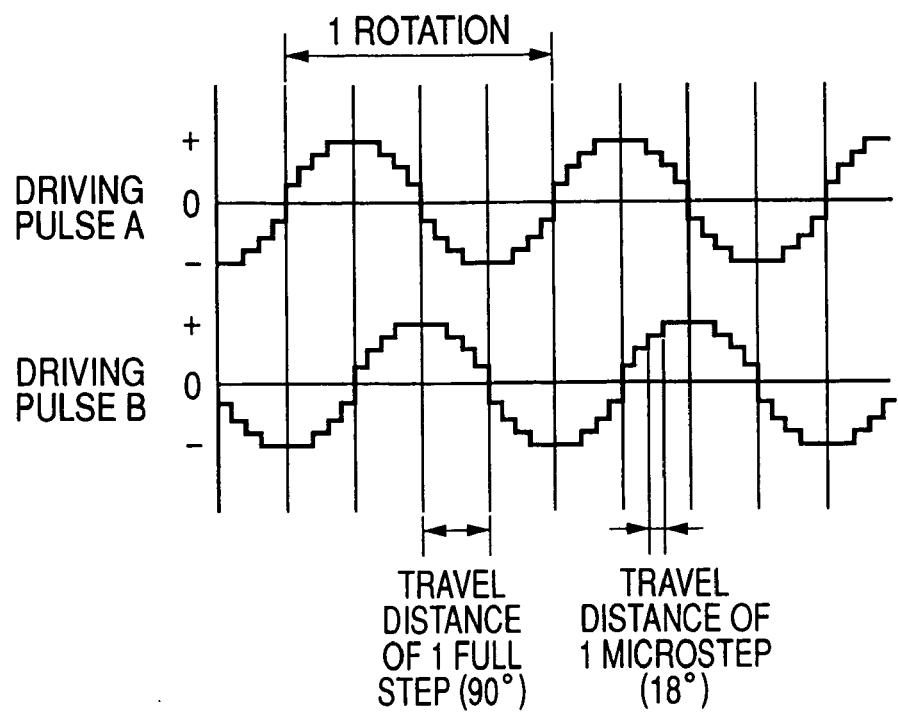
FIG. 5 is a voltage waveform chart of driving pulses A and B when a two-phase stepping motor 36 of FIG. 3 is driven in a microstep mode.

When a microstep driving method is used to drive the stepping motor 36, the rotation angle per one step can be made small. FIG. 5 shows an example of the waveforms of the driving pulses A and B applied to the individual coils 36*a* and 36*b* when the two-phase stepping motor 36 is driven in a microstep driving mode. FIG. 5 shows the waveforms when the division number is set to '5'. With the driving pulses, the rotor 37 rotates by a travel distance (=18°) of a fifth of one step at the time of full step driving per one microstep.

In FIG. 1, a focus servo 42 performs a focus control of the optical pick-up 34 at the time of data recording and reproduction and at the time of image forming. A tracking servo 44 performs a tracking servo of the optical pick-up 34 at the time of data recording and reproduction. At the time of image forming, the tracking servo is turned off. A vibration signal generator 46 generates a vibration signal at the time of image forming and supplies the generated vibration signal to a tracking actuator of the optical pick-up 34 so as to vibrate an objective lens 33. Then, laser light 35 vibrates at an amplitude larger than a unit transfer amount by one microstep operation of the optical pick-up 34 in the radial direction of the CD-R disk 14. With the vibration operation, laser light 35 scans the CD-R disk 14 while meandering at a width larger than the unit transfer amount of the optical pick-up 34. Subsequently, as described with reference to FIG. 16, in cooperation with an overwriting operation in the same circumferential direction position, image forming can be performed with a small gap. A laser driver 48 drives a laser diode 70 (see FIG. 6) of the optical pick-up 34 at the time of data recording and reproduction and at the time of image forming. An ALPC (Automatic Laser Power control) circuit 50 controls laser power to instructed values at the time of data recording and reproduction and at the time of image forming.

An encoder 52 encodes record data in a predetermined CD format at the time of data recording. The laser driver 48 modulates laser light 35 according to the encoded record data, and records the record data in the data recording layer 18 of the CD-R disk 14 as pits. At the time of image forming, the encoder 52 generates a pulse signal (image forming signal) whose duty changes according to gradation data of the individual pixels forming the image data. The laser driver 48 modulates laser light 35 according to the pulse signal whose duty changes, and changes visual light characteristics of the image forming layer 24 of the CD-R disk 14 so as to perform image forming by a monochrome multiple gradation. The processing details of the encoder 52 will be described below in detail. A decoder 54 performs EFM demodulation of a return light-receiving signal of the optical pick-up 34 at the time of data reproduction so as to perform data reproduction.

The host computer 10 transmits record data at the time of data recording and image data at the time of image forming to the CD-R drive 12. The record data and image data are received by an interface 58 of the CD-R drive 12, then temporarily stored in a buffer memory 60, and subsequently read out and supplied to the encoder 52. At the time of data reproduction, data reproduced by the decoder 54 is transmitted to the host computer 10 through the interface 58. The host computer 10 also transmits an instruction by an operator to the CD-R drive 12 at the time of data recording and reproduction and at the time of image forming. The instruction is transmitted to the system control unit 56 through the interface 58. The system control unit 56 sends instructions according to the received instruction to the individual circuits of the CD-R drive 12 and executes corresponding operations.

Information on an image forming condition preset and an image forming condition settable by the operator for the CD-R drive 12 is stored in a memory 62 of the CD-R drive 12. In this embodiment, in the memory 62, information on 'a transfer amount N of the optical pick-up 34 by one full step operation of the stepping motor 36' and 'a division number M of a microstep operation of the stepping motor 36' that are used to calculate a unit transfer amount of the optical pick-up 34 in the radial direction of the CD-R disk 14 is stored as 'the preset image forming condition'. Further, in the memory 62, information on various kinds of 'image forming mode' according to a combination of 'a rotation speed of the optical disk' and 'an encoding speed of the image data by the encoder 52' is stored as 'the image forming condition settable by the operator'. The system control unit 56 reads out the image forming condition from the memory 62 at an appropriate time before image forming (for example, when the image forming program of the host computer 10 gets started and the transmission of the image forming condition to the CD-R drive 12 is requested from the image forming program) and transmits the read image forming condition to the host computer 10 through the interface 58.

Figure 6:
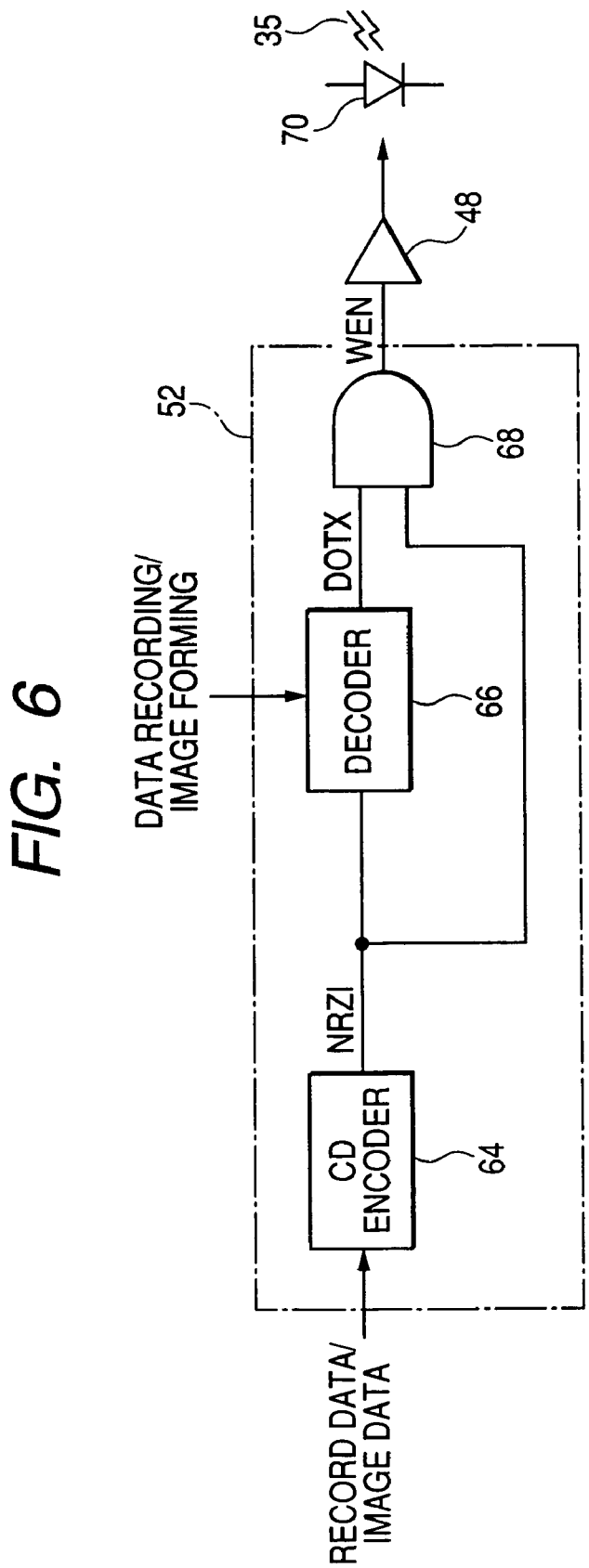
FIG. 6 is a block diagram showing an example of the configuration of an encoder 52 of FIG. 1.

The encoder 52 will now be described. FIG. 6 shows an example of the configuration of the encoder 52. In FIG. 6, a CD encoder 64 receives data (record data at the time of data recording or image data at the time of image forming) that is transmitted from the host computer 10 shown in FIG. 1 through the interface 58 and the buffer memory 60. The CD encoder 64 interleaves the record data and then performs the EFM modulation. Further, the CD encoder 64 performs a normal signal processing for generating a CD signal (addition of a synchronization signal, parity data, and a margin bit, and NRZI (Non Return Zero Invert) conversion) and continuously generates a recording signal having 588 channel bits as one EFM frame. The recording signal generated by the CD encoder 64 at the time of data recording passes through an AND gate 68 as it is and is supplied to the laser driver 48. The laser driver 48 drives the laser diode 70 according to the recording signal so as to modulate power of laser light 35 to a binary digit (raises laser power to a level forming bits in a period where the recording signal is in the 'H' level, and lowers laser power to a level forming no bits in a period where the recording signal is in the 'L' level), and records the recording signal in the data recording layer 18 of the CD-R disk 14 as pits.

At the time of image forming, the CD encoder 64 processes the image data, like the record data at the time of data recording. However, interleaving may be not performed. That is, when interleaving is not performed, the CD encoder 64 performs the EFM modulation on the image data without interleaving, performs the same processing as the normal signal processing for generating a CD signal (addition of a synchronization signal, parity data, and a margin bit, and NRZI (Non Return Zero Invert) conversion), and continuously generates data having 588 channel bits as one EFM frame. Here, the data of one EFM frame includes image data for one pixel (gradation data representing a gradation of the pixel). That is, in this embodiment, data for one pixel is represented by one EFM frame length. Further, when interleaving is performed on the image data by the CD encoder 64, the sequence of the image data is changed by interleaving and a desired image may not be formed. In this case, the host computer 10 performs reverse interleaving on the image data (a processing of changing the sequence of the image data in advance such that, when the CD encoder 64 performs interleaving, the image data has a sequence before the host computer 10 performs reverse interleaving) and then transmits the image data to the CD-R drive 12. With this processing, when the CD encoder 64 performs interleaving on the transmitted image data, the image data has the correct sequence. The CD encoder 64 performs the EFM modulation on the image data having the correct sequence.

The decoder 66 is switched at the time of data recording and at the time of image forming. That is, the decoder 66 continuously outputs a signal of the 'H' level at the time of data recording. The signal of the 'H' level is input to one input terminal of the AND gate 68. Accordingly, the output of the CD encoder 64 that is input to the other input terminal of the AND gate 68 at the time of data recording, that is, the recording signal passes through the AND gate 68 as it is.

At the time of image forming, the decoder 66 performs the EFM demodulation on data output from the CD encoder 64, and acquires the gradation data of the pixel one by one for one EFM frame. Then, the decoder 66 outputs a pulse signal DOTX that has a cycle of one EFM frame and whose duty changes according to the acquired gradation data of the pixel. The pulse signal DOTX is input to one input terminal of the AND gate 68. Accordingly, at the time of image forming, the AND gate 68 opens a gate for a time according to the gradation of the corresponding pixel for one EFM frame cycle so as to pass an output signal (an EFM signal subjected to the NRZI conversion) of the CD encoder 64 to the other terminal for the time. A fragment signal WEN (an image forming signal for forming image on one pixel) of an NRZI signal output from the AND gate 68 is not significant, but has a duty of approximately 50% since it is the NRZI signal. Therefore, a duty of the NRZI fragment signal WEN passing through the AND gate 68 in one EFM frame period corresponding to one pixel to one EFM frame length (a ratio of the sum of pulse widths of the NRZI fragment signals WEN passing through the AND gate 68 in one EFM frame period to one EFM frame length) corresponds to the duty of the pulse signal DOTX, that is, corresponds to the gradation of the corresponding pixel.

At the time of image forming, the NRZI fragment signal WEN output from the AND gate 68 is supplied to the laser driver 48 as the image forming signal. The laser driver 48 drives the laser diode 70 according to the image forming signal WEN so as to modulates power of laser light 35 to a binary digit (raises laser power to an image forming level in a period where the image forming signal WEN is in the 'H' level, and lowers laser power to a non-image forming level in a period where the image forming signal WEN is in the 'L' level), and changes visual light characteristics of the image forming layer 24 of the CD-R disk 14 so as to perform image forming. In this case, a distance in the circumferential direction on the CD-R disk 14 corresponding to one EFM frame length (that is, a length in the circumferential direction allocated to form image on one pixel) is extremely short (in case of the image forming condition of Table 1 described below, at a position where the diameter of the disk is 10 cm, a length of approximately 0.12 mm in Mode 1, and a length of approximately 0.07 mm in Mode 2 and Mode 3), the one pixel in which the image is formed is not recognized as one point (dot) by human's eyes. Therefore, a difference in duty of the image forming signal WEN passing through the AND gate 68 to one EFM frame length is recognized as a difference in image forming density by the human's eyes (the higher the duty is, the darker image is recognized). With this configuration, an image by gradation representation is formed in the image forming layer 24 of the CD-R disk 14.

Figure 7:
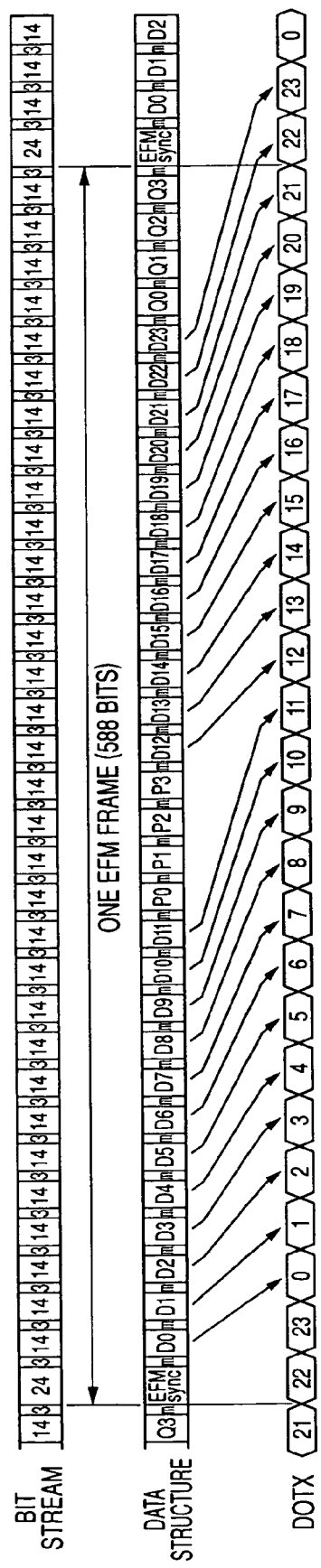
FIG. 7 is a diagram showing the relationship between a data structure of an EFM frame and a pulse signal DOTX of FIG. 6.

The setting of the duty of pulse signal DOTX output from the decoder 66 at the time of image forming will now be described with reference to FIGS. 7 and 8. FIG. 7 shows the relationship between a data structure of an EFM frame and the pulse signal DOTX. 'Bit Stream' in FIG. 7 represents a format of the NRZI signal, and numeric values in the drawing are the number of bits. 'Data Structure' in FIG. 7 represents the data structure of the EFM frame. 'EFM sync' is a sync pattern representing segments of the EFM frame. 'D0' to 'D23' are data, 'P0' to 'P3' are P parities, 'Q0' to 'Q3' are Q parities, and 'm' is a margin bit. The data structure itself of the EFM frame may be for data recording or for image forming, A difference between data for data recording and data for image forming is the contents of the data D0 to D23. That is, the data D0 to D23 for data recording is data representing information to be recorded, while the data D0 to D23 for image forming is data according to the gradation of one pixel allocated to one EFM frame.

'DOTX' in FIG. 7 is the pulse signal DOTX. The pulse signal DOTX is a signal in which one EFM frame length is equally divided into divisions 0 to 23 and the 'H' level or 'L' level is set by divisions (have duties changing in a range of 0 to 100%). As shown by an arrow in FIG. 7, the data D0 to D23 are respectively associated with the divisions 0 to 23 of the pulse signal DOTX. When the data D0 to D23 is a specific code, the corresponding divisions of the pulse signal DOTX are set to the 'H' level. In other codes, the corresponding divisions of the pulse signal DOTX are set to the 'L' level. That is, according to the gradation data (here, data representing a gradation having 25 levels from the 0th gradation to the 24th gradation) demodulated by the decoder 66 (FIG. 6), all the divisions of the pulse signal DOTX are set to the 'L' level in the 0th gradation (no image forming), only one division of the pulse signal DOTX is set to the 'H' level in the 1st gradation, two divisions of the pulse signal DOTX are set to the 'H' level in the 2nd gradation, . . . , and all the divisions of the pulse signal DOTX are set to the 'H' level in the 24th gradation (the darkest density).

Figure 8:
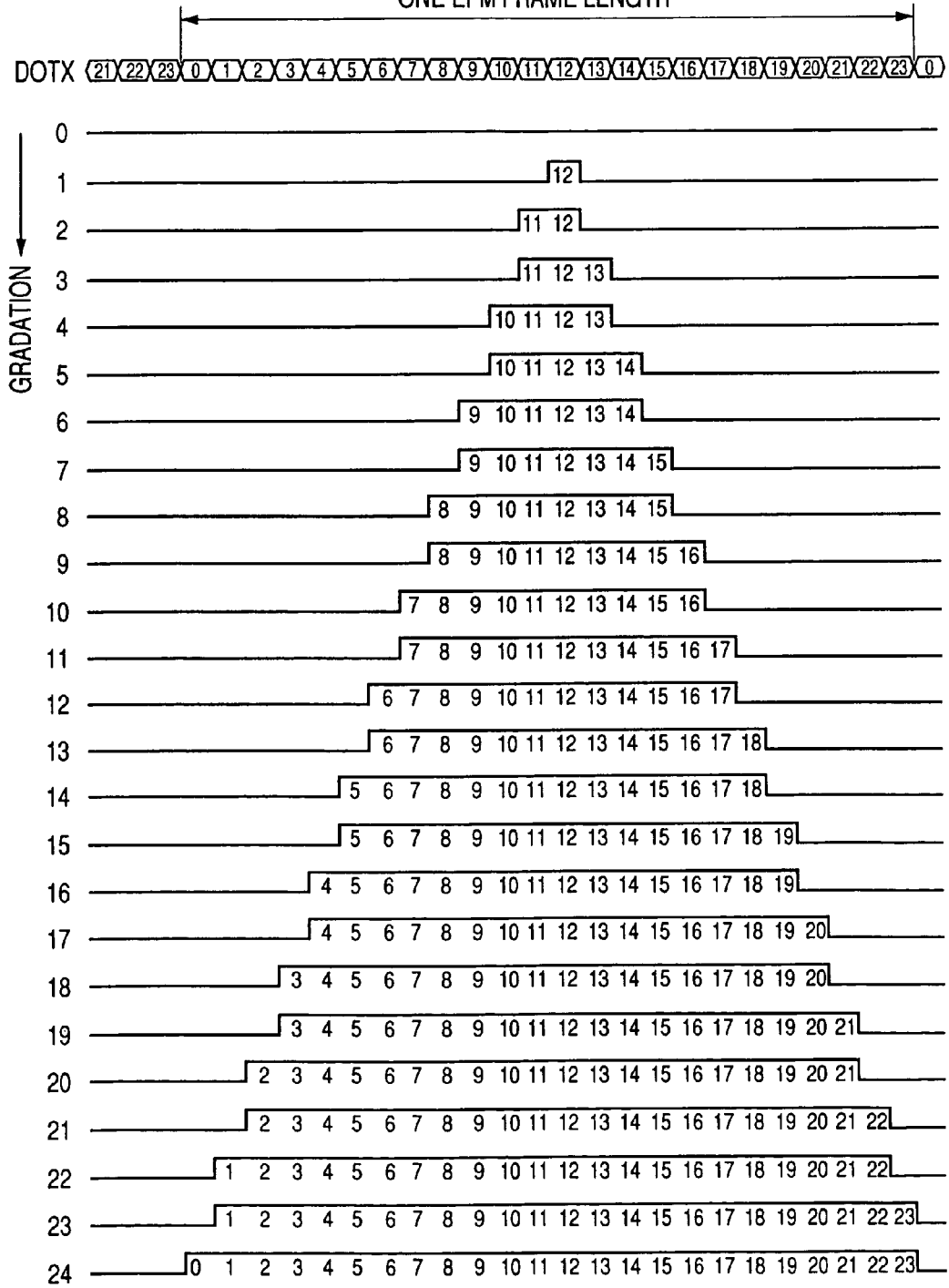
FIG. 8 is a diagram showing an example of a waveform of the pulse signal DOTX for each gradation.

FIG. 8 shows an example of the waveform of the pulse signal DOTX for every gradation having 25 levels from the 0th gradation to the 24th gradation. In this setting, a period where the pulse signal DOTX is in the 'H' level is sequentially widened toward front and rear sides from the vicinity of the central portion of a period of one EFM frame length as the number of gradations increases. The decoder 66 of FIG. 6 respectively sets the values of the data D0 to D23 such that the pulse signal DOTX shown in FIG. 8 is generated according to demodulated gradation data. That is, among the data D0 to D23, data corresponding to the divisions where the pulse signal DOTX is set in the 'H' level is set in the specific code, while data corresponding to the divisions where the pulse signal DOTX is set in the 'L' level is set in other codes than the specific code.

Figure 9:
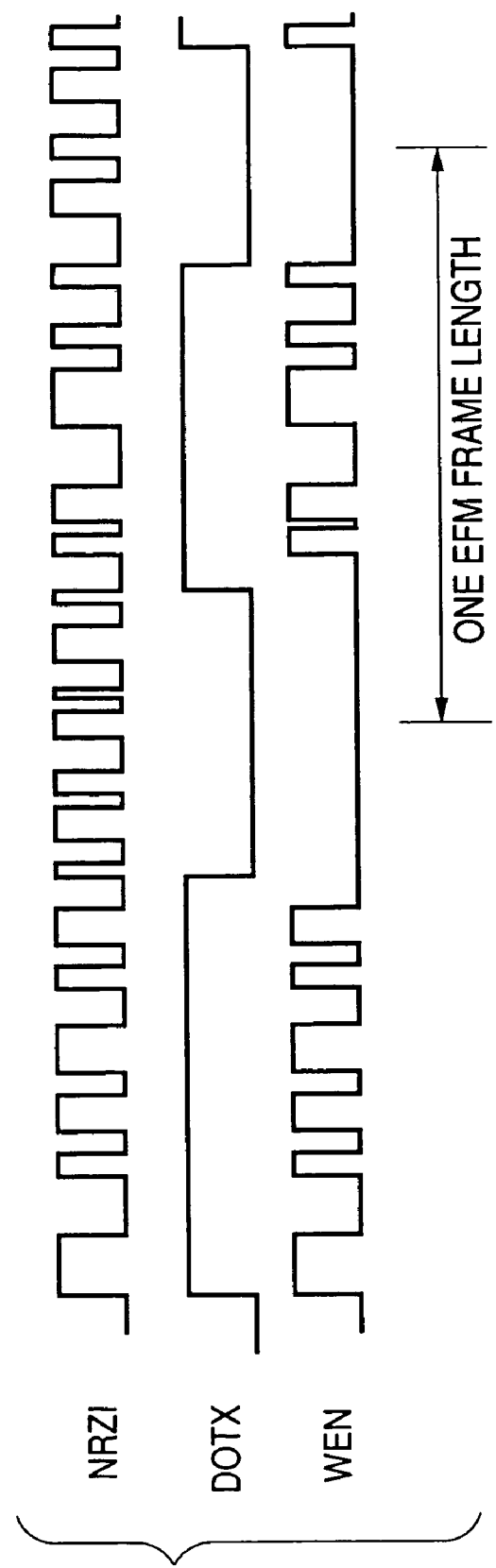
FIG. 9 is an operation waveform chart of an encoder 52 of FIG. 6 at the time of image forming.

FIG. 9 shows an operation waveform of the encoder 52 shown in FIG. 6 at the time of image forming. In FIG. 9, the NRZI signal is switched with a cycle of one EFM frame length by the pulse signal DOTX through the AND gate 68, and the NRZI fragment signal WEN is generated.

The outline of the above system configuration at the time of operations of data recording, data reproduction, and image forming by will now be described.

<<Operation at the Time of Data Recording>>

The operation of the system shown in FIG. 1 at the time of data recording will be described. At the time of data recording, the CD-R disk 14 faces the optical pick-up 34 such that the data recording surface 14a (FIG. 2) turns downward. The spindle servo 32 controls the spindle motor 30 at a constant linear velocity (CLV) such that a wobble signal to be extracted from the light-receiving signal of the optical pick-up 34 has a predetermined frequency. The focus servo 42 and the tracking servo 44 are turned on. The vibration signal generator 46 stops generating the vibration signal. The system control unit 56 detects the disk rotation, and drives the stepping motor 36 by a predetermined distance for every predetermined rotation. Then, the system control unit 56 sequentially transfers the optical pick-up 34 in the circumferential direction of the disk, and controls such that the position of an optical axis of the objective lens 33 is constantly close to a recording position of the CD-R disk 14.

The host computer 10 transmits the record data to the CD-R drive 12. The record data is temporarily stored in the buffer memory 60 through the interface 58. The record data is sequentially read out from the buffer memory 60 according to the progress of recording, and is interleaved by the encoder 52. Then, the record data is subjected to the EFM modulation to be then converted into the NRZI signal. The NRZI signal is supplied to the laser driver 48 through the ALPC circuit 50.

The laser driver 48 modulates recording laser light 35 on the basis of the NRZI signal. Modulated laser light 35 is emitted from the optical pick-up 34, and then is irradiated onto the data recording layer 18 of the CD-R disk 14 so as to perform data recording.

<<Operation at the Time of Data Reproduction>>

The operation of the system shown in FIG. 1 at the time of data reproduction will be described. At the time of data reproduction, the CD-R disk 14 faces the optical pick-up 34 such that the data recording surface 14a (FIG. 2) turns downward. The spindle servo 32 controls the spindle motor 30 at a constant linear velocity (CLV) such that a clock for reproduction from the light-receiving signal of the optical pick-up 34 has a predetermined frequency. The focus servo 42 and the tracking servo 44 are turned on. The vibration signal generator 46 stops to generate the vibration signal. The system control unit 56 detects the disk rotation, and drives the stepping motor 36 by a predetermined distance for every predetermined rotation. Then, the system control unit 56 sequentially transfers the optical pick-up 34 in the circumferential direction of the disk, and controls such that the position of the optical axis of the objective lens 33 is constantly close to a reproduction position of the CD-R disk 14. The optical pick-up 34 emits reproduction laser light 35 so as to read a signal recorded in the data recording layer 18 of the CD-R disk 14. The signal read by the optical pick-up 34 is subjected to the EFM demodulation by the decoder 54, then is output from the CD-R drive 12 through the interface 58, and is subsequently transmitted to the host computer 10.

<<Operation at the Time of Image Forming>>

The operation of the system shown in FIG. 1 at the time of image forming will be described. At the time of image forming, the CD-R disk 14 faces the optical pick-up 34 such that the image forming surface 14b (FIG. 2) turns downward. The spindle servo 32 controls the spindle motor 30 at a constant angular velocity (CAV) through a PLL control such that an FG pulse output from the spindle motor 30 for every predetermined rotation angle (for example, 6 or 18 pulses are output at uniform angular intervals for each revolution) and a clock obtained by dividing a quartz oscillation clock are in phase. The focus servo 42 is turned on, and the tracking servo 44 is turned off. The vibration signal generator 46 generates the vibration signal. The system control unit 56 detects the disk rotation, drives the stepping motor 36 by a predetermined distance at a position of a predetermined rotation angle for every revolution times indicated as the number of overwriting times, and sequentially transfers the optical pick-up 34 in the circumferential direction of the disk.

The host computer 10 transmits the image data to the CD-R drive 12. The image data is temporarily stored in the buffer memory 60 through the interface 58. The image data is sequentially read out from the buffer memory 60 according to the progress of image forming, then is subjected to the EFM modulation by the encoder 52 (or subjected to the EFM modulation after interleaving), and subsequently is converted into the NRZI signal in FIG. 9. In addition, the image data is modulated into the NRZI fragment signal WEN in of FIG. 9 having a duty according to the gradation values of the individual pixels forming the image data. The NRZI fragment signal WEN is supplied to the laser driver 48 through the ALPC circuit 50. The laser driver 48 modulates image forming laser light 35 using the NRZI fragment signal WEN. Modulated image forming laser light 35 is emitted from the optical pick-up 34, and then is irradiated onto the image forming layer 24 of the CD-R disk 14 so as to form a visual image, that is, perform image forming.

Figure 10:
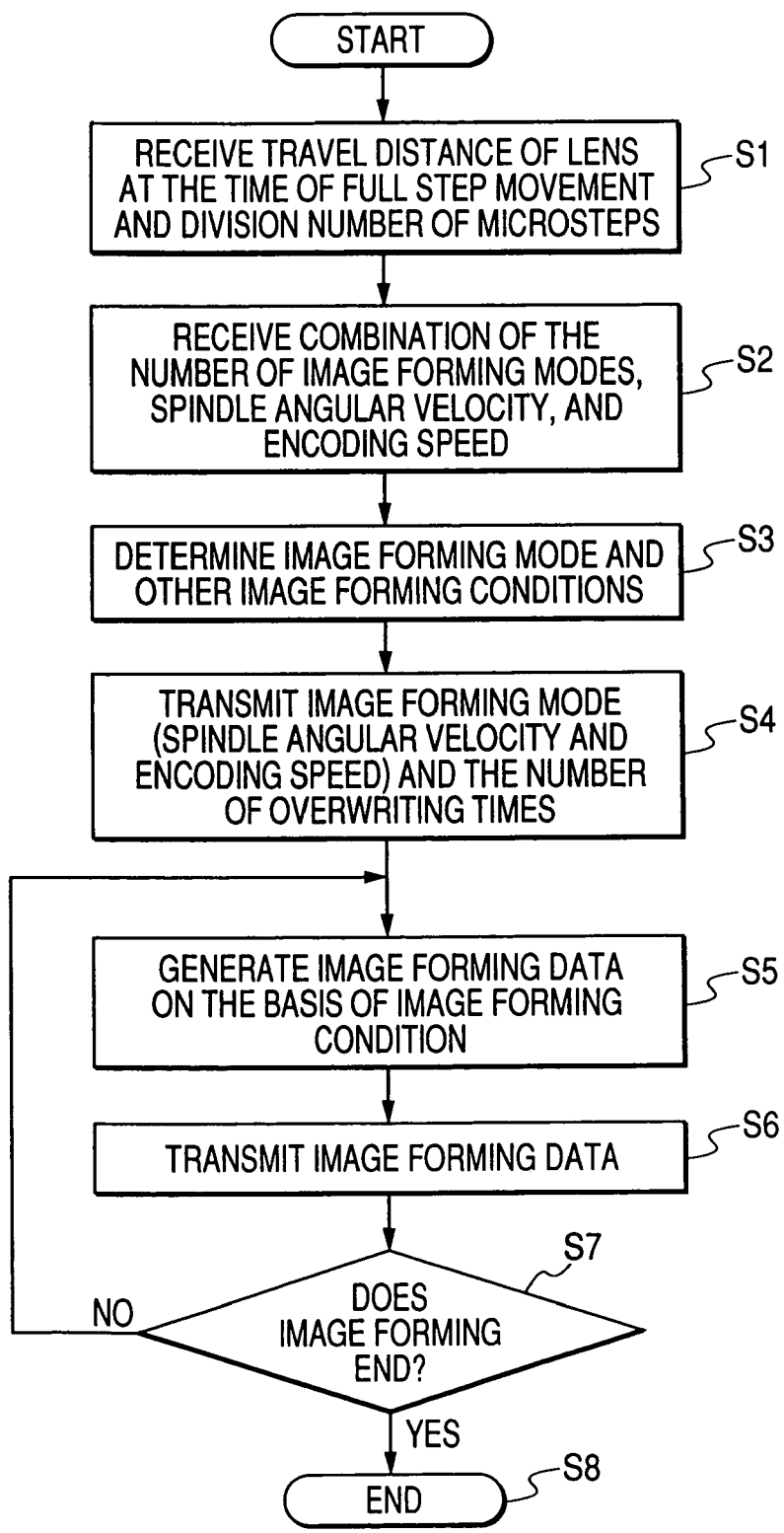
FIG. 10 is a flowchart showing an image forming control that is executed by a program installed in a host computer 10 of FIG. 1.
Figure 11:
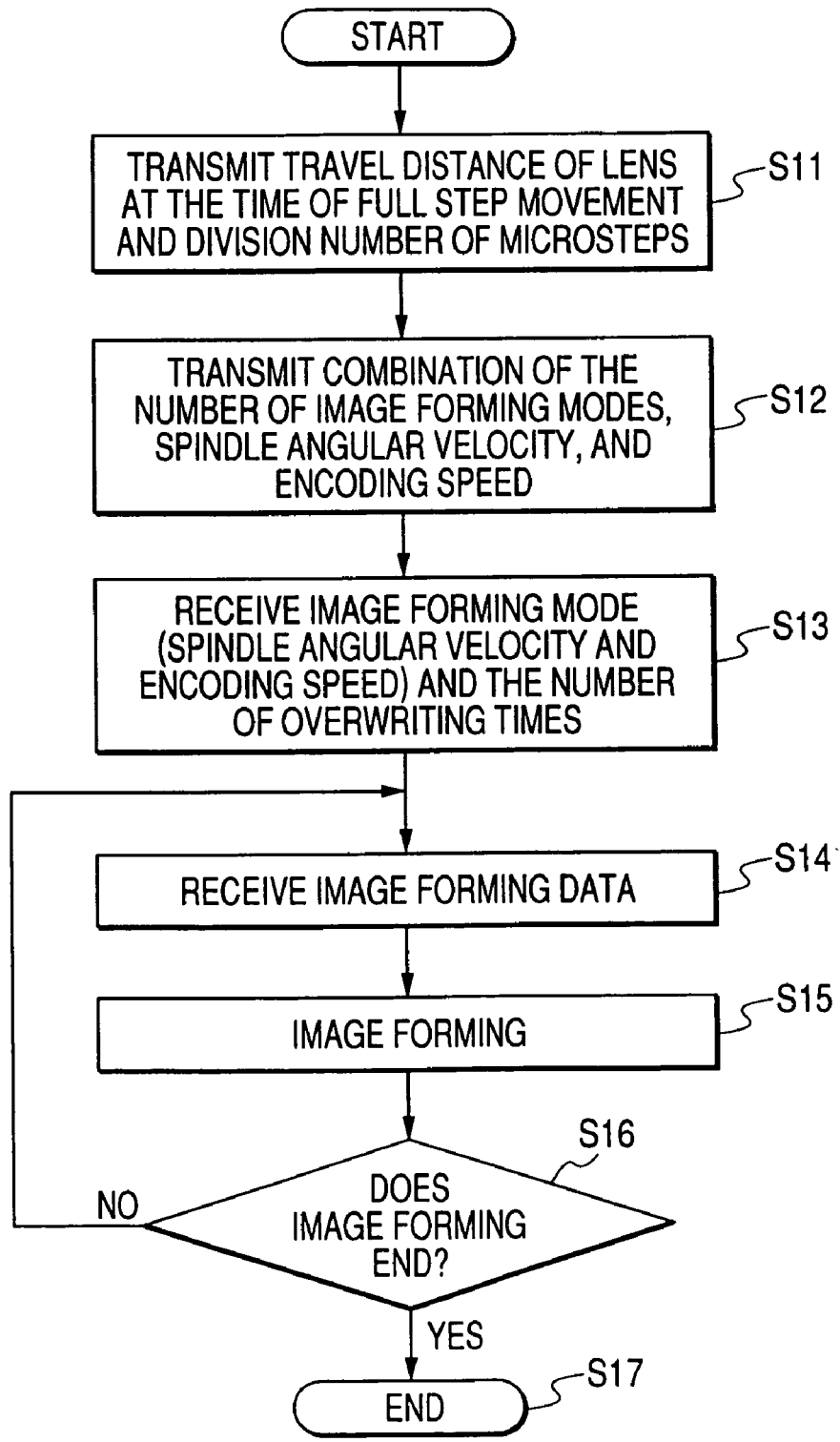
FIG. 11 is a flowchart showing an image forming control that is executed by a program installed in a CD-R drive 12 of FIG. 1.

Next, the controls at the time of image forming that are executed by the image forming programs installed in the host computer 10 and the CD-R drive 12 will be described. FIG. 10 shows a control that is executed by a program installed in the host computer 10. FIG. 11 shows a control that is executed by a program installed in the CD-R drive 12. The CD-R drive 12 transmits the information of 'the transfer amount N of the optical pick-up 34 in the disk radial direction by one full step operation of the stepping motor 36' and 'the division number M of the microstep operation of the stepping motor 36' as the image forming condition preset in the CD-R drive 12 at an appropriate time before image forming (for example, as described above, when the image forming program of the host computer 10 gets started and the transmission of the image forming condition to the CD-R drive 12 is requested from the image forming program) (Step S11 of FIG. 11).

Next, the CD-R drive 12 transmits data of various kinds of image forming modes indicating a combination of the rotation speed of the spindle motor 30 (spindle angular velocity) and the encoding speed of the image data by the encoder 52 as the image forming condition settable by the operator (Step S12 of FIG. 11). In this embodiment, as the image forming mode, a combination of the spindle angular velocity and the encoding speed is set such that the number of pixels in which the image is to be formed for one revolution becomes an integer number. That is, when the number of pixels in which the image is to be formed for one revolution of the disk becomes the integer number, circumferential positions of pixels in which the image is to be formed at constant intervals in the circumferential direction are fixed regardless of the positions in the disk radial direction (that is, the pixels are processed for image forming at the same circumferential positions for every position in the radial direction), and an arithmetic operation for generating (extracting) image data to be used for image forming (image forming data) from the original image data is easily performed.

The combination of the spindle angular velocity and the encoding speed such that the number of pixels on which the image is to be formed for one revolution of the disk becomes the integer number is calculated as follows. That is, in this embodiment, one pixel is associated with one EFM frame length (=588 channel bits). 'The encoding speed' is 'an encoding clock frequency (=4.3218 Mbits (=a clock for 7350 EFM frames for one second)) in a normal encoding speed (1×) defined by the CD standards×an encoding speed magnification (a magnification to the standard encoding speed)'. The encoding speed corresponds to the number of pixels in which the image is to be formed for every one second. Therefore, the combination of 'the encoding speed magnification' and 'the spindle angular velocity' is set such that a value of 'an encoding clock frequency at a normal speed (=4.3218 Mbits)×the encoding speed magnification÷the spindle angular velocity÷588', that is, the number of pixels for one revolution (=the number of EFM frames) becomes an integer number. Specifically, as the combination of 'the encoding speed magnification' and 'the spindle angular velocity' in which the number of pixels on which the image is to be formed for one revolution becomes the integer number, for example, the combinations shown in Table 1 are used. Moreover, the combination of 'the encoding speed magnification' and 'the spindle angular velocity' changes an image forming speed and image forming quality (resolution and contrast ratio), as shown in Table 1.

TABLE 1

| Image Forming Mode | Encoding Speed Magnification | Spindle Angular Velocity | The Number of Pixels for One Revolution of Disk | Image forming speed | Resolution | Contrast Ratio |
| --- | --- | --- | --- | --- | --- | --- |
| 1 | 47.25 times | 131.25 rps | 2646 pixels | high | medium | low |
| 2 | 45.0 times | 75.0 rps | 4410 pixels | medium | high | medium |
| 3 | 22.5 times | 37.5 rps | 4410 pixels | low | high | high |

At Step S12 of FIG. 11, the CD-R drive 12 transmits the number of combinations (the number of image forming modes) of 'the encoding speed magnification' and 'the spindle angular velocity' and values of 'the encoding speed magnification' and 'the spindle angular velocity' in each combination. For example, when three kinds of combinations shown in Table 1 are transmitted, '3' as the value of the image forming mode is first transmitted, and then the values of 'the encoding speed magnification' and 'the spindle angular velocity' in each image forming mode are sequentially transmitted.

When the information of 'the transfer amount N of the optical pick-up 34 in the disk radial direction by one full step operation of the stepping motor 36' and 'the division number M of the microstep operation of the stepping motor 36' is transmitted from the CD-R drive 12 (Step S11 of FIG. 11), the host computer 10 receives the information (Step S1 of FIG. 10). Moreover, as described below with reference to FIG. 13, the host computer 10 calculates the unit transfer amount of the optical pick-up 34 in the disk radial direction through an N/M arithmetic operation based on 'the transfer amount N' and 'the division number M' received from the CD-R drive 12 and accumulates the calculated unit transfer amount in the radial direction so as to calculate a position of the optical axis of the objective lens 33 of the optical pick-up 34 in the disk radial direction. Accordingly, instead of individually transmitting the data of 'the transfer amount N' and 'the division number M' from the CD-R drive 12, the result of the N/M arithmetic operation, that is, the unit transfer amount of the optical pick-up 34 in the disk radial direction, can be transmitted from the CD-R drive 12 to the host computer 10 as the information of the image forming condition. However, when the result of the N/M arithmetic operation becomes an infinite decimal, the rounding result of the infinite decimal is transmitted. Accordingly, when the position of the optical axis of the objective lens 33 of the optical pick-up 34 in the disk radial direction is calculated by accumulating the rounded arithmetic operation results, a positional shift with respect to the actual position of the optical axis of the objective lens 33 of the optical pick-up 34 is generated. Therefore, when the result of the N/M arithmetic operation becomes the infinite decimal, it is preferable to follow the above-described method, that is, to individually transmit the data of 'the transfer amount N' and 'the division number M'.

Next, when the information of 'the number of image forming modes' and the information of the values of 'the encoding speed magnification' and 'the spindle angular velocity' in each image forming mode are transmitted from the CD-R drive 12, the host computer 10 first receives the information of 'the number of image forming modes', and then receives the information of the values of 'the encoding speed magnification' and 'the spindle angular velocity' (Step S2 of FIG. 10). The number of received combinations of 'the encoding speed magnification' and 'the spindle angular velocity' reaches a value indicated by 'the number of image forming modes', the host computer 10 ends the reception of Step S2.

Next, the host computer 10 displays, as the image forming condition settable by the operator so as to be set (selected) by the operator, information on the display 11 according to the received information of the image forming mode. The display contents include, for example, numeric values of the number of the image forming mode and the encoding speed magnification and the spindle angular velocity for each image forming mode, or characters (for example, characters, such as 'high', 'medium', and 'low' shown in Table 1) representing degrees of a speed, resolution, and contrast ratio for each image forming mode, respectively, instead of or in addition to the numeric values. The operator selects one image forming mode on the screen of the display 11.

In addition, the host computer 10 displays the number of overwriting times of the image data for every multiple revolutions at the same position in the radial direction of the CD-R disk 14 on the display 11 so as to be set (selected) by the operator. In this embodiment, it is assumed that the number of overwriting times is information preset in the image forming program of the host computer 10 as the image forming condition settable by the operator, not as the image forming condition to be acquired from the CD-R drive 12. Alternatively, the number of overwriting times may be set as image forming condition settable by the operator in the CD-R drive 12 in advance, and the information of the number of overwriting times may be transmitted from the CD-R drive 12 to the host computer 10 before image forming. Then, the host computer 10 may display the received information of the number of overwriting times on the display 11 so as to be set (selected) by the operator. In addition, the minimum of the number of overwriting times may be set in the CD-R drive 12 in advance, and the information of the minimum of the number of overwriting times may be transmitted from the CD-R drive 12 to the host computer before image forming. Then, the host computer 10 may display the number of overwriting times on the display 11 so as to be set (selected) by the operator with the received number of overwriting times as the minimum.

Regarding the image forming conditions settable by the operator, when the image forming mode and other image forming conditions (the number of overwriting times and the like) are determined according to the setting by the operator (Step S3 of FIG. 10), the host computer 10 transmits the information of the image forming conditions determined by the operator to the CD-R drive 12 (Step S4 of FIG. 10). The CD-R drive 12 receives the information (Step S13 of FIG. 11) and sets itself to a state where image forming can be performed based on the image forming condition indicated by the information.

When the setting of the image forming conditions are completed through the above steps and the original image data to be formed is prepared on the image forming program of the host computer 10, an image forming standby state is made. In this state, when the operator performs an image forming start operation on the image forming program of the host computer 10, the image forming program generates (extracts) the image data to be used for image forming (image forming data) from the original image data according to the set image forming conditions (Step 5 of FIG. 10).

Figure 12:
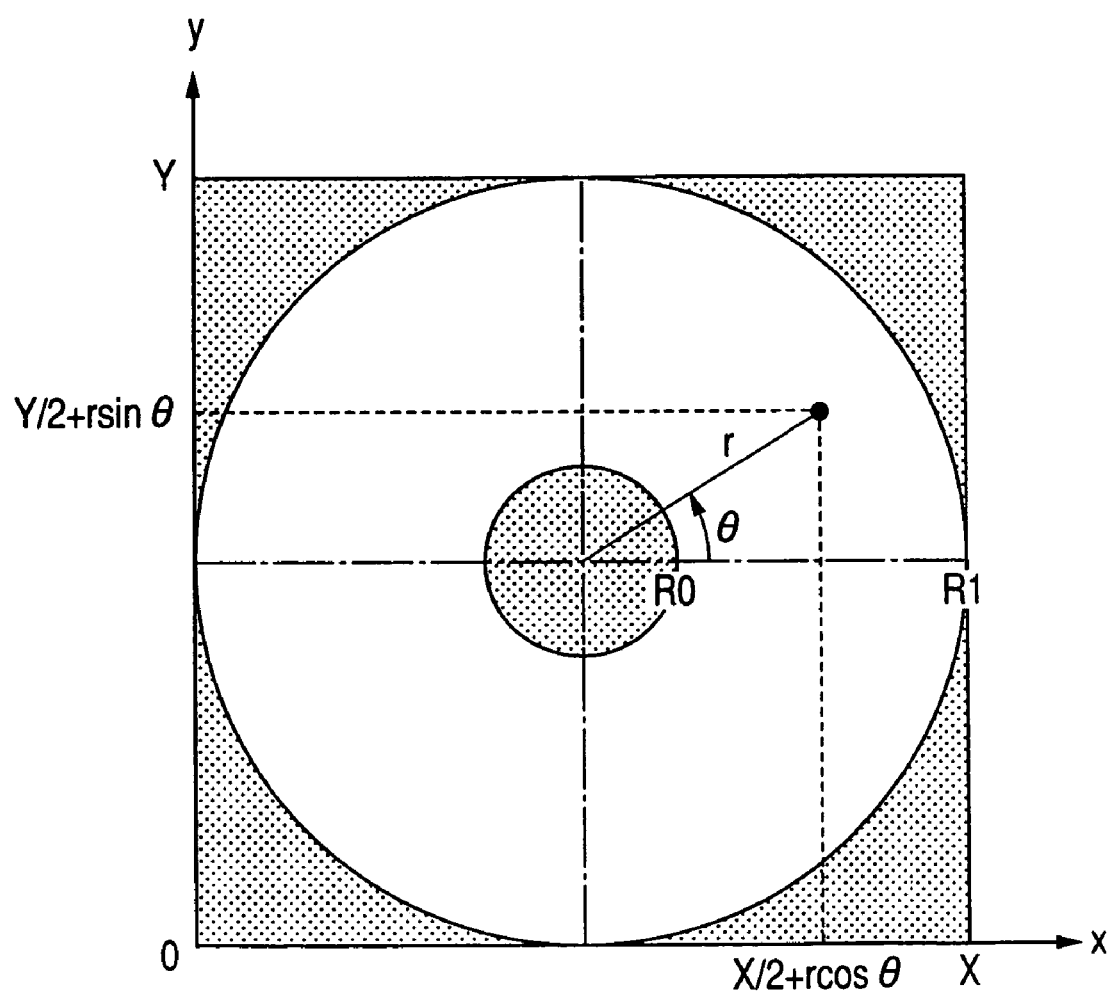
FIG. 12 is a diagram showing the relationship between coordinate positions of original image data and image forming data.

A method of generating the image forming data by the image forming program of the host computer 10 will be described with reference to FIGS. 12 and 13. FIG. 12 shows the relationship between coordinate positions of the original image data and the image forming data. A region indicated by a white ring in FIG. 12 represents an image forming region of the label surface of the CD-R disk 14. The original image data is, for example, a bitmap format, and the coordinate positions of the individual pixels forming the original image data are respectively represented by an orthogonal coordinate (x, y) with a position at the lowermost end of the original image data as an origin in a y-axis direction and with a leftmost end of the original image data as an origin position in an x-axis direction. Assuming that the maximum of the coordinate of the original image data in the x-axis direction is X and the maximum in the y-axis direction is Y, the coordinate of the center (corresponding to the rotation center of the CD-R disk 14) of the original image data is represented by (X/2, Y/2).

Meanwhile, image forming is performed by sequentially transferring the optical pick-up 34 in the disk radial direction while rotating the CD-R disk 14, and thus, for convenience, the image forming data to be used for image forming is represented by a polar coordinate with the rotation center of the CD-R disk 14 as a pole. The coordinate positions of the individual pixels forming the image forming data is represented by a polar coordinate $(r, \theta)$ where the center (X/2, Y/2) of the original image data on the orthogonal coordinate serves as a pole, a direction parallel to the x-axis direction of the orthogonal coordinate is a polar line, a moving radius is r, and a deviation angle $\theta$ increases from the polar line in a counter-clockwise direction. Then, an arbitrary polar coordinate position $(r, \theta)$ of the image forming data corresponds to an orthogonal coordinate position $(X/2+r \cos \theta, Y/2+r \sin \theta)$.

Figure 13:
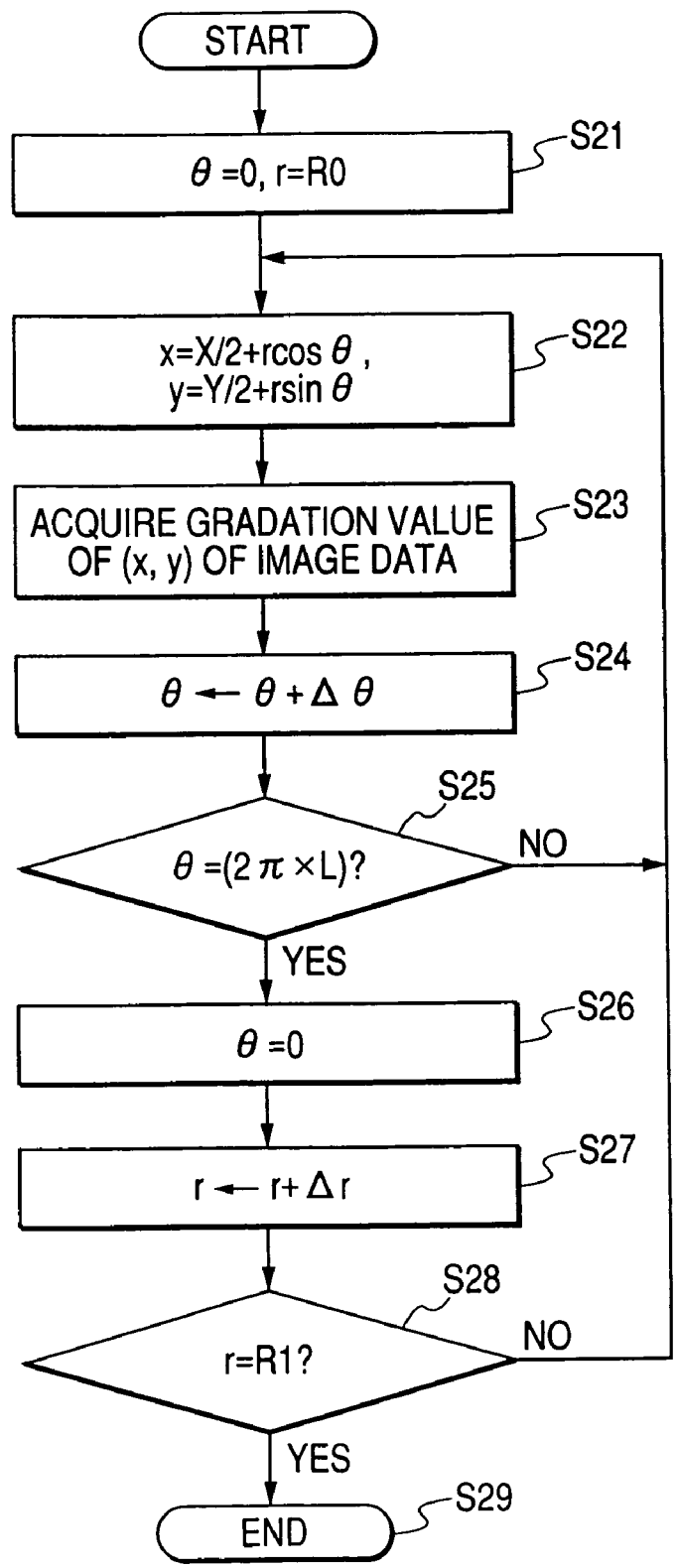
FIG. 13 is a flowchart showing a procedure of generating image forming data on the basis of original image data.

FIG. 13 shows a procedure of generating the image forming data on the basis of the original image data. Here, parameters other than the above-described ones are defined as follows.

'R0': A writing start radius of the image forming region of the CD-R disk 14, that is, an innermost radial position of the image forming region (see FIG. 12). The value of R0 is set by an operator on a setting screen to be displayed on the display 11 by the image forming program of the host computer 10.

'R1': A writing end radius of the image forming region of the CD-R disk 14, that is, an outermost radial position of the image forming region (see FIG. 12). The value of R1 is set by the operator on the setting screen to be displayed on the display 11 by the image forming program of the host computer 10.

'$\Delta r$': The unit transfer amount of the optical pick-up 34 in the disk radial direction, that is, the travel distance of the optical pick-up 34 by one microstep of the stepping motor 36. The value of $\Delta r$ is calculated through the N/M arithmetic operation based on the information of 'the transfer amount N of the optical pick-up 34 in the disk radial direction by one full step operation of the stepping motor 36' and 'the division number M of the microstep operation of the stepping motor 36' received from the CD-R drive 12.

'$\Delta \theta$': A difference in deviation angle between pixels on which the image is to be formed adjacent in the circumferential direction. The value of the difference in deviation angle $\Delta \theta$ is obtained through the arithmetic operation of the number of pixels on which the image is to be formed for one revolution of the disk (see Table 1) by the program of the host computer on the basis of the image forming mode selected by the operator among a plurality of image forming modes transmitted from the CD-R drive 12, and the following arithmetic operation based on the calculated number of pixels on which the image is to be formed for one revolution of the disk.

Δθ=2π/the number of pixels on which the image is to be formed for one revolution 'L': The number of overwriting times at the same position in the radial direction (integer)

A description will be given for FIG. 13. First, for the writing start position (r=R0, θ=0) of the image forming region of the CD-R drive 14 (Step S21), a corresponding position (x, y) on the orthogonal coordinate is calculated by the following equations (1) and (2) (Step S22).

$$x = X/2 + r \cos\theta \quad (1)$$

$$y = Y/2 + r \sin\theta \quad (2)$$

Next, image data (gradation data) of the calculated position (x, y) is extracted from the original image data in which the positions of the individual pixels are represented by the orthogonal coordinates (Step S23). Moreover, when x and y calculated through the equations (1) and (2) have a decimal portion, the values are rounded to an integer by rounding off the decimal portion or rounding to the nearest integer, such that the image data of the corresponding position is extracted.

Next, similarly, for the positions (r=R0, θ=Δθ), (r=R0, θ=2Δθ), (r=R0, θ=3Δθ), . . . of the pixels on which the image is to be formed sequentially adjacent in the circumferential direction at the same position in the radial direction, the corresponding positions (x, y) on the orthogonal coordinate are sequentially calculated from the equations (1) and (2), and the image data of the individual calculated positions (x, y) are sequentially extracted from the original image data (Step S24). Then, after the operation is performed by the number of revolutions indicated by the number of overwriting times L (that is, θ=2π×L), the acquisition of the image forming data for the number of overwriting times with respect to the writing start radial position R0 ends (Step S25).

Next, the value of θ returns to 0 (zero) (Step S26), and then, for the next radial position r=R0+Δr, similarly, image data forming the image forming data are sequentially extracted from the original image data for each Δθ from θ=0 to θ=2π× L. Then, the operation is repeated while the radial position increases by Δr (step S27). When the image forming position reaches the writing end radial position R1 (Step S28), the image forming data for the entire image forming region is acquired from the original image data, and then the generation of the image forming data ends (Step S29). With this operation, the image forming data which is converted into the polar coordinate is generated based on the original image data represented by the orthogonal coordinate.

The host computer 10 sequentially transmits the image data (gradation data) forming the image forming data to the CD-R drive 12 in an acquisition (extraction) order from the original image data by the processing of FIG. 13 (or in an order replaced for the order by interleaving described above) (Step S6 of FIG. 10) while generating the image forming data in the above-described manner (Step S5 of FIG. 10). Further, prior to the transmission of the image forming data, the host computer 10 sends the information of the writing start radial position R0 and the writing end radial position R1 set by the operator to the CD-R drive 12. The CD-R drive 12 receives the information of the writing start radial position R0 and the writing end radial position R1 and the image forming data (S14 of FIG. 11), and sequentially forms image on pixels by the received image forming data in the CD-R disk 14 in a reception order of the image data (or in an order replaced for the order to have an original generation arrangement by interleaving described above) (Step S15 of FIG. 11). At the time of image forming, the CD-R drive 12 operates by the spindle angular velocity, the encoding speed, the microstep travel distance, and the number of overwriting times set in the image forming condition, and the image data transmitted from the host computer 10 are sequentially generated (extracted) to be suited to the image forming condition. Accordingly, when the pixels according to the image data are formed from the writing start radial position R0 in a generation order of the image data, an image according to an original image is formed on the CD-R disk 14. Therefore, the individual image data (gradation data) may be transmitted from the host computer 10 to the CD-R drive 12 in the generation order (or in a shuffled order of the order by reverse interleaving described above). It is unnecessary to transmit the data of the coordinate position (r, θ) for each pixel. However, as another transmission method, data obtained by adding the data of the coordinate position (r, θ) to the image data may be transmitted from the host computer 10 to the CD-R drive 12 as the individual image data forming the image forming data, and the CD-R drive 12 may analyze the coordinate position (r, θ) of the image data so as to perform image forming at the corresponding position. When the image forming position reaches the writing end radial position R1 indicated by the information, image forming ends (Step S7 of FIG. 10 or Step S16 of FIG. 11). When image forming ends, the host computer 10 and the CD-R drive 12 end the controls (Step S8 of FIG. 10 or Step S17 of FIG. 11). Moreover, in the above description, the host computer 10 transmits the image forming data to the CD-R drive 12 while generating the image forming data. Alternatively, after completely generating the image forming data of the entire image, the host computer 10 may transmit the generated image forming data to the CD-R drive 12. Further, the CD-R drive 12 may sequentially perform image forming while receiving the image forming data or may completely receive the image forming data of the entire image and then start image forming. Moreover, in the above description, the host computer 10 transmits the information of the writing end radial position R1 to the CD-R drive 12, and the CD-R drive 12 ends image forming by judging whether or not the image forming position reaches the writing end radial position R1 on the basis of the information (Step S16 of FIG. 11). Alternatively, when the image forming data are completely transmitted, the host computer 10 may transmit information notifying that all the image forming data are completely transmitted and the CD-R drive 12 may end image forming after receiving the information (Step S16).

Figure 14:
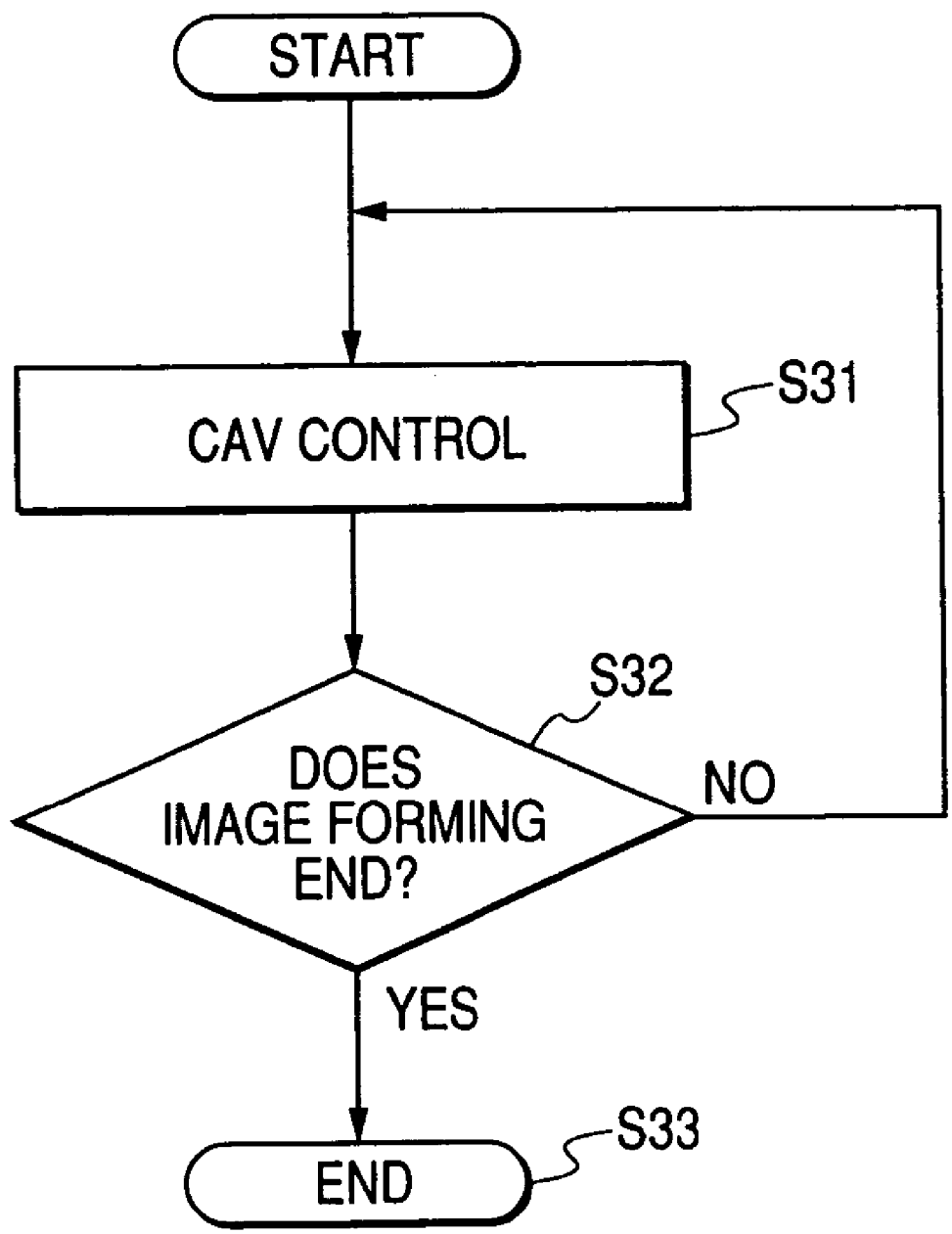
FIG. 14 is a flowchart showing a control of a spindle motor 30 at the time of image forming by a CD-R drive 12 of FIG. 1.

The image forming control by the image forming program installed in the system control unit 56 of the CD-R drive 12 will be described with reference to FIGS. 14 and 15. FIG. 14 shows the control of the spindle motor 30. On the basis of the information of the image forming mode selected by the operator through the host computer 10 before image forming starts and transmitted to the CD-R drive 12 (Step S13 of FIG. 11), the system control unit 56 performs the CAV control on the spindle motor 30 at an angular velocity (see Table 1) indicated by the image forming mode information (Step S31). The control is continuously performed until image forming ends (Steps S32 and S33).

Figure 15:
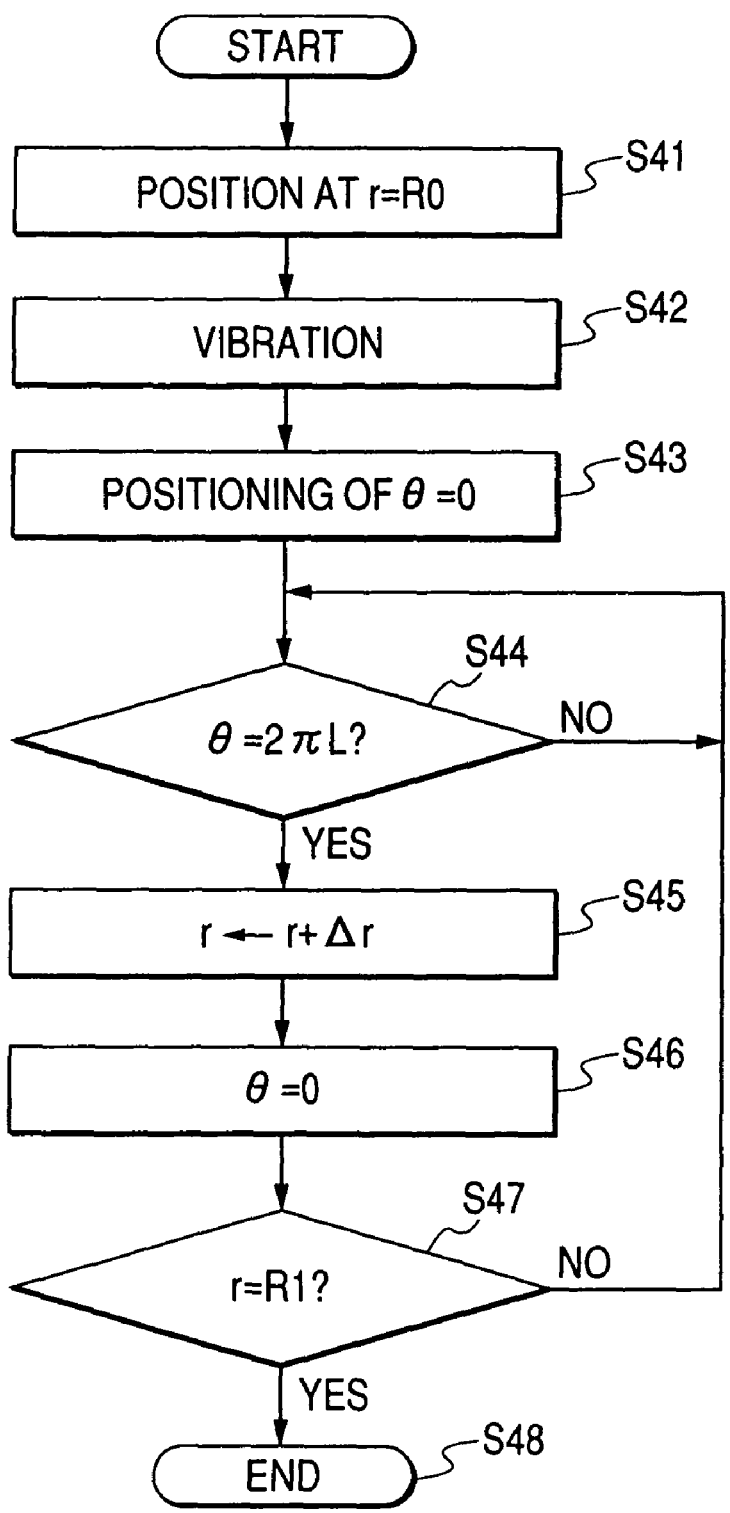
FIG. 15 is a flowchart showing a control of an optical pick-up 34 at the image of image forming by a CD-R drive 12 of FIG. 1.

FIG. 15 shows the control of the optical pick-up 34. The system control unit 56 positions the position of the optical axis of the objective lens 33 of the optical pick-up 34 in the disk radial direction to the writing start radial position R0 before image forming starts (Step S41). The control is implemented by driving the stepping motor 36 so as to temporarily return the optical pick-up 34 in an inner circumferential direction, then detecting the innermost origin position (a position detected by a limit switch or a position mechanically anchored to a stopper), and subsequently driving the stepping motor 36 by the number of steps from that position until the objective lens 33 reaches the writing start radial position R0. Subsequently, the vibration signal generator 46 generates the vibration signal and supplies the generated vibration signal to the tracking actuator of the optical pick-up 34 so as to vibrate the objective lens 33 at a predetermined cycle in the disk radial direction (Step S42). When the vibration frequency Hz is set to a value larger than the spindle angular velocity rps, the objective lens 33 vibrates for one cycle or more for one spindle rotation. The vibration is continuously performed until image forming ends. Moreover, at the time of image forming, the tracking servo is turned off.

When the objective lens 33 vibrates by the vibration signal, it is preferable to set the values of 'the vibration frequency Hz' and 'the spindle angular velocity rps' such that a quotient of 'the vibration frequency Hz/the spindle angular velocity rps' becomes a circulating decimal having long circulating digits. That is, with this setting, even though the number of overwriting times is large, scanning positions of laser light 35 can be set so as not to overlap each other during overwriting. For example, if the vibration frequency is set to 200 Hz with respect to the spindle angular velocity 131.25 rps of the image forming mode 1 shown in Table 1, the quotient of 'the vibration frequency Hz/the spindle angular velocity rps' becomes the circulating decimal having long circulating digits.

After the spindle motor 30 is stably under the CAV control at an angular velocity indicated by the image forming mode information (Step S32 of FIG. 14) and the position of the optical axis of the objective lens 33 of the optical pick-up 34 in the disk radial direction is positioned at the writing start radial position R0 (Step S41 of FIG. 15), image forming starts from an arbitrary position in the circumferential direction. The position in the circumferential direction where image forming starts is defined as $\theta=0$ (Step S43). During image forming, the number of clocks generated by dividing the same quartz oscillation clock as one used for the CAV control of the spindle motor 30 is counted, and thus the position in the circumferential direction with respect to the position $\theta=0$ is detected for every $\Delta\theta$ (the difference in deviation angle between pixels on which the image is to be formed adjacent in the circumferential direction). Then, when $\theta=2\pi\times L$ (Step S44), it is judged that the revolution is made by the number of times according to the number of overwriting times L. Then, the stepping motor 36 is driven for one microstep, and the position of the optical axis of the objective lens 33 (the vibration center) is moved by a distance $\Delta r$ in the outer circumferential direction of the disk (Step S45). The count value of $\theta$ in $\theta=2\pi\times L$ returns to 0 (zero) (Step S46), and the count of $\theta$ is repeated as it is. The movement of the distance $\Delta r$ is performed each time $\theta=2\pi\times L$. Subsequently, after the position in the disk radial direction reaches the writing end radial position R1 (Step S47), the control ends (Step S48).

Moreover, instead of setting an arbitrary position, at which image forming starts, as $\theta=0$ in the above manner, a recognition code indicating that it is a disk for image forming on label surface may be formed on an inner side than the label surface image forming region of the CD-R disk 14. Then, the optical pick-up 34 may detect a position in the circumferential direction of the recognition code at which given data exists before image forming, may define the position as $\theta=0$, and may start image forming from the position in the circumferential direction. With this configuration, even though the CD-R disk 14 is taken out and put in the CD-R drive 12, the position of $\theta=0$ is not changed, and thus image forming can be continuously written.

The encoder 52 sequentially encodes, in an order of the image data transmitted from the host computer 10 (or in an order replaced for the order to have an original generation arrangement by interleaving described above), the image forming data at an encoding speed indicated by the image forming mode (the encoding clock frequency (=4.3218 Mbits)×the encoding speed magnification) using the clocks generated by dividing the same quartz oscillation clock as one used for the CAV control of the spindle motor 30 and the detection of the optical position of the objective lens 33 of the optical pick-up 34 in the disk radial direction, and sequentially generates the image forming signal (the NRZI fragment signal WEN of FIG. 9) whose duty changes according to the gradation data forming the image data.

Image forming is performed by driving the laser diode 70 (FIG. 6) of the optical pick-up 34 with the image forming signal (the NRZI fragment signal WEN of FIG. 9) sequentially encoded in the above manner and modulating laser light 35. That is, when the position of the circumferential direction of the disk where image forming starts is defined as $\theta=0$ (Step S43 of FIG. 15) and the position of the optical axis (the vibration center) of the objective lens 33 of the optical pick-up 34 is at an arbitrary position (r, $\theta$) on the CD-R disk 14, the positions of the optical axis of the objective lens 33 in the circumferential direction and the radial direction of the disk (the vibration center) and the encoding operation of the encoder 52 are in synchronization with each other, such that image forming is performed with laser light 35 modulated by the NRZI fragment signal WEN generated on the basis of the image data of the corresponding position (r, $\theta$). Since the CAV control of the spindle motor 30 and the encoding processing by the encoder 52 are performed on the basis of the same quartz oscillation clock, the synchronization can be easily implemented.

FIG. 16 shows an example of a locus of the scanning position of image forming laser light 35 in one position in the radial direction when the number of overwriting times is set to '3'. In FIG. 16, for convenience of explanation, the circumference of the CD-R disk 14 is linearly expanded. Moreover, in the example of FIG. 16, the parameters are set as follows.

The transfer amount N of the optical pick-up 34 in the disk radial direction by one full step operation of the stepping motor 36=95 μm The division number M of the microstep operation of the stepping motor 36=8

The travel distance $\Delta r$ of the optical pick-up 34 by one microstep of the stepping motor 36=N/M=95 μm/8

The vibration amplitude of laser light 35=±50 μm with respect to the vibration center The vibration frequency Hz of laser light 35/the spindle angular velocity rps>1 (circulating decimal)

Referring to FIG. 16, with the vibration operation, laser light 35 scans a range in the disk radial direction wider than the travel distance $\Delta r$ of the optical pick-up 34 by one microstep. Besides, since the setting is made such that 'the vibration frequency Hz of laser light 35/the spindle angular velocity rps' becomes the circulating decimal, the loci of laser light 35 do not overlap each other for each revolution. Therefore, even though individual image forming lines by laser light 35 are fine, image forming can be implemented with a small gap.

In the above embodiment, 'the division number M of the microstep operation of the stepping motor 36' is fixed as 'the preset image forming condition'. Alternatively, before image forming, information of a settable division number M may be transmitted from the CD-R drive 12 to the host computer 10 as 'the image forming condition settable by the operator'. In this case, the host computer 10 that receives the information of the settable division number M displays the information on the display 11 so as to be set by the operator. Then, the host computer 10 transmits the information of the division number M set (selected) by the operator to the CD-R drive 12. Accordingly, at the time of image forming, the CD-R drive 12 changes the waveforms of the driving pulses A and B (FIG. 5) for microstep driving to the number of stages according to the set division number M, and sequentially moves at a microstep travel distance according to the division number M in the radial direction, thereby performing image forming. In this case, the host computer 10 extracts, from the original image data, image data at a position in the radial direction for each microstep travel distance according to the division number M set (selected) by the operator and transmits the extracted image data to the CD-R drive 12 as image forming data.

In the above-described embodiment, since the number of gradations of the image data is set to 25 levels from the 0th gradation to the 24th gradation, and the number of divisions of the pulse signal DOTX (that is, the number of settable duties) is set to '24', all the gradations of the image data can be separately formed only by a difference in duty of the pulse signal DOTX. Therefore, for the same circumferential position of the same radial position, the pulse signal DOTX is set to have the same duty for each overwriting revolution. However, when the number of gradations of the image data is larger than the number of divisions of the pulse signal DOTX, it is difficult to separately form all the gradations of the image data only by setting the same duty of the pulse signal DOTX for each overwriting revolution. In such a case, therefore, at the same circumferential position of the same radial position, the duty of the pulse signal DOTX may vary according to the overwriting revolution. For example, assuming that the number of overwriting times is set to '2', if image forming is performed by the first gradation in the first revolution, and subsequently image forming is performed by the second gradation at the same circumferential position of the second revolution, image forming is performed at the circumferential position by the 1.5th gradation on an average per one revolution. Accordingly, by varying the duty of the pulse signal DOTX according to the overwriting revolution, logically, image forming for fully reproducing the gradations of the image data whose the number of gradations correspond to 'the number of divisions of the pulse signal DOTX×the number of overwriting times' can be performed on the basis of the image data.

In the above-described embodiment, image forming is performed on the image forming layer 24 using the CD-R disk 14 for image forming on label surface. Alternatively, the invention can be applied to a case where a normal CD-R disk is used and image forming is performed on the data recording layer.

In the above-described embodiment, the invention is applied to a recordable CD system. Alternatively, the invention can be applied to a recordable DVD system and optical disk systems based on other standards. Further, the invention can be applied to an optical disk system and the like connected to or contained in a personal computer, a DVD video recorder containing a TV tuner and/or a hard disk drive.

What is claimed is:

1. A method of forming an image on an optical disk comprising:
    connecting a computer and an optical disk image forming apparatus in a communication state;
    storing, in the computer, original image data of an image to be formed as a visual image on a data recording layer of the optical disk or an image forming layer provided separately from the data recording layer;
    loading the optical disk on the optical disk image forming apparatus;
    transmitting information of a preset image forming condition from the optical disk image forming apparatus to the computer;
    generating, by the computer, image forming data adapted to the image forming condition based on the stored original image data and the information of the image forming condition, and transmitting the generated image forming data to the optical disk image forming apparatus;
    causing the optical disk image forming apparatus to sequentially transfer an optical head in a radial direction of the optical disk while rotating the optical disk; and
    irradiating image forming laser light modulated based on the transmitted image forming data from the optical head onto the optical disk according to the image forming condition to form the visual image on the data recording layer or the image forming layer, wherein:
    the image forming condition is a condition that is related to an operation setting of the optical disk image forming apparatus at a time of image forming, and that is preset in the optical disk image forming apparatus,
    the image forming condition is a condition for a unit transfer amount of the optical head in the radial direction of the optical disk or a condition for a plurality of parameters that are used to calculate the unit transfer amount,
    the computer generates, based on the original image data, the image forming data for each position in the radial direction of the optical disk, which is adapted to the unit transfer amount set by the image forming condition, and transmits the generated image forming data to the optical disk image forming apparatus, and
    the optical disk image forming apparatus modulates image forming laser light based on the transmitted image forming data while sequentially transferring the optical head by the set unit transfer amount in the radial direction of the optical disk to form the visual image.

2. The method according to claim 1, wherein
the transfer of the optical head in the radial direction of the optical disk is executed with a stepping motor as a driving source,
the plurality of parameters used to calculate the unit transfer amount of the optical head include a transfer amount of the optical head by one full step operation of the stepping motor and a division number of a microstep operation of the stepping motor, and
the computer calculates the unit transfer amount of the optical head by an arithmetic operation of 'the transfer amount of the optical head by one full step operation/the division number of the microstep operation'.

3. The method according to claim 1, wherein
a position of the original image data is represented by an orthogonal coordinate and a position of the image forming data is represented by a polar coordinate, and
a polar coordinate position of the image forming data adapted to the image forming condition is calculated, the polar coordinate position is converted into an orthogonal coordinate position to obtain a corresponding position of the original image data and the original image data at the obtained corresponding position is used as the image forming data at the corresponding position.

4. A method of forming an image on an optical disk comprising:
- connecting a computer and an optical disk image forming apparatus in a communication state;
- storing, in the computer, original image data of an image to be formed as a visual image on a data recording layer of the optical disk or an image forming layer provided separately from the data recording layer;
- loading the optical disk on the optical disk image forming apparatus;
- transmitting information of a preset image forming condition from the optical disk image forming apparatus to the computer;
- generating, by the computer, image forming data adapted to the image forming condition based on the stored original image data and the information of the image forming condition, and transmitting the generated image forming data to the optical disk image forming apparatus;
- causing the optical disk image forming apparatus to sequentially transfer an optical head in a radial direction of the optical disk while rotating the optical disk; and
- irradiating image forming laser light modulated based on the transmitted image forming data from the optical head onto the optical disk according to the image forming condition to form the visual image on the data recording layer or the image forming layer, wherein:
- the image forming condition is a condition that is related to an operation setting of the optical disk image forming apparatus at a time of image forming, and that is preset in the optical disk image forming apparatus,
- the image forming condition is a condition for a rotation speed of the optical disk,
- the computer generates, based on the original image data, the image forming data for each position in a circumferential direction of the optical disk adapted to the condition of the rotation speed of the optical disk set by the image forming condition and transmits the generated image forming data to the optical disk image forming apparatus, and
- the optical disk image forming apparatus modulates image forming laser light according to the transmitted image forming data while rotating the optical disk at the set rotation speed to form the visual image.

5. The method according to claim 4, wherein
- the image forming condition is a condition for an encoding speed at which the image forming data is encoded to generate a modulated signal of image forming laser light,
- the computer generates, based on the original image data, image forming data for each position in a circumferential direction of the optical disk adapted to the condition of the encoding speed set by the image forming condition, and
- the optical disk image forming apparatus encodes the transmitted image forming data at the set encoding speed to generate the modulated signal of image forming laser light and modulates image forming laser light by the modulated signal to form the visual image.

6. An optical disk image forming apparatus for forming an image on an optical disk, the optical disk image forming apparatus comprising:
- an interface that communicates with a computer and receives image forming data from the computer;
- an optical head that is transferred sequentially in a radial direction of the optical disk while the optical disk is rotated; and
- an image forming unit that modulates and emits image forming laser light from the optical head according to the received image forming data, and irradiates modulated image forming laser light through the optical head onto a data recording layer of the optical disk or an image forming layer provided separately from the data recording layer to form a visual image in the data recording layer or the image forming layer, wherein:
- the interface transmits information of a preset image forming condition to the computer prior to receiving the image forming data from the computer, and receives the image forming data generated according to the image forming condition from the computer,
- the image forming unit forms the visual image based on the image forming condition and the received image forming data, and
- the image forming condition is a condition that is related to an operation setting of the optical disk image forming apparatus at a time of image forming, and that is preset in the optical disk image forming apparatus,
- the image forming condition is a condition for a unit transfer amount of the optical head in the radial direction of the optical disk or a condition for a plurality of parameters that are used to calculate the unit transfer amount,
- the computer generates, based on the original image data, the image forming data for each position in the radial direction of the optical disk, which is adapted to the unit transfer amount set by the image forming condition, and transmits the generated image forming data to the optical disk image forming apparatus, and
- the optical disk image forming apparatus modulates image forming laser light based on the transmitted image forming data while sequentially transferring the optical head by the set unit transfer amount in the radial direction of the optical disk to form the visual image.

7. A computer readable recording medium storing an optical disk image forming program to be executed by a computer in which the computer is connectable in a communication state with an optical disk image forming apparatus on which an optical disk is loaded, and stores original image data of an image to be formed as a visible image in a recording layer of an optical disk or an image forming layer provided separately from the data recording layer, and in which the optical disk image forming apparatus includes an interface that receives image forming data from the computer, an optical head that is transferred sequentially in a radial direction of the optical disk while the optical disk is rotated, an image forming unit that modulates and emits image forming laser light from the optical head according to the received image forming data, and irradiates modulated image forming laser light through the optical head onto a data recording layer of the optical disk or an image forming layer provided separately from the data recording layer to form a visual image in the data recording layer or the image forming layer, wherein the program causes the computer to execute:
- receiving information of a preset image forming condition from the optical disk image forming apparatus prior to transmitting the image forming data to the optical disk image forming apparatus;
- generating image forming data adapted to the image forming condition based on the stored original image data and the received information of the image forming condition; and
- transmitting the generated image forming data to the optical disk image forming apparatus, wherein:
- the image forming condition is a condition that is related to an operation setting of the optical disk image forming apparatus at a time of image forming, and that is preset in the optical disk image forming apparatus, and the program causes the computer to further execute:

displaying the image forming condition for the number of overwrite times of the image forming data at the same position of the optical disk in the radial direction multiple times on the display so that the operator can set the number of overwrite times prior to transmitting the image forming data to the optical disk image forming apparatus; and transmitting information of the number of overwrite times set by the operator on the display.

\* \* \* \* \*